United States Patent
Gao et al.

(10) Patent No.: US 10,514,929 B2
(45) Date of Patent: Dec. 24, 2019

(54) COMPUTER INSTRUCTION PROCESSING METHOD, COPROCESSOR, AND SYSTEM

(71) Applicant: HUAWEI TECHNOLOGIES CO., LTD., Shenzhen, Guangdong (CN)

(72) Inventors: Yunwei Gao, Beijing (CN); Xinlong Lin, Beijing (CN); Jianfeng Zhan, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 48 days.

(21) Appl. No.: 15/844,191

(22) Filed: Dec. 15, 2017

(65) Prior Publication Data

US 2018/0107489 A1  Apr. 19, 2018

Related U.S. Application Data

(63) Continuation of application No. PCT/CN2016/073942, filed on Feb. 17, 2016.

(30) Foreign Application Priority Data

Jun. 17, 2015  (CN) .......................... 2015 1 0336409

(51) Int. Cl.
 *G06F 9/455* (2018.01)
 *G06F 15/80* (2006.01)
 (Continued)

(52) U.S. Cl.
 CPC .............. *G06F 9/3885* (2013.01); *G06F 8/52* (2013.01); *G06F 9/30* (2013.01); *G06F 9/30174* (2013.01);
 (Continued)

(58) Field of Classification Search
 CPC ...... G06F 9/3885; G06F 9/30; G06F 9/30174; G06F 9/3836; G06F 9/3863;
 (Continued)

(56) References Cited

U.S. PATENT DOCUMENTS 6,769,121 B1 * 7/2004 Koyama ............... G06F 9/4862
   709/201
7,093,258 B1 * 8/2006 Miller .................... G06F 9/485
   718/105
(Continued)

FOREIGN PATENT DOCUMENTS

CN    101387969 A    3/2009
CN    101546301 A    9/2009
(Continued)

OTHER PUBLICATIONS

Grimes et al. "64-Bit Processor: The Intel i860 64-Bit Processor: A General-Purpose CPU with 3D Graphics Capabilities" 1989 (Year: 1989).*

(Continued)

*Primary Examiner* — Daniel H Pan
(74) *Attorney, Agent, or Firm* — Womble Bond Dickinson (US) LLP

(57) ABSTRACT

Embodiments of the present application disclose a computer instruction processing method, a coprocessor, and a system. The computer instruction processing method includes: receiving, by a coprocessor, a first instruction set migrated by a central processing unit CPU; acquiring, according to the first instruction set that is applicable to the CPU for execution, a second instruction set for execution in the coprocessor; and executing binary codes in the second instruction set. In this way, the coprocessor that executes the second instruction set substitutes for the CPU that executes the first instruction set, CPU load is reduced, and usage of the coprocessor is improved.

21 Claims, 10 Drawing Sheets

(51) Int. Cl.
*G06F 9/38* (2018.01)
*G06F 9/30* (2018.01)
*G06F 9/50* (2006.01)
*G06F 8/52* (2018.01)
*G06F 9/48* (2006.01)

(52) U.S. Cl.
CPC .......... *G06F 9/3836* (2013.01); *G06F 9/3863* (2013.01); *G06F 9/45516* (2013.01); *G06F 9/5088* (2013.01); *G06F 9/3017* (2013.01); *G06F 9/3877* (2013.01); *G06F 9/3879* (2013.01); *G06F 9/45504* (2013.01); *G06F 9/45508* (2013.01); *G06F 9/45537* (2013.01); *G06F 9/4856* (2013.01); *G06F 9/4862* (2013.01); *G06F 2009/4557* (2013.01); *G06F 2209/509* (2013.01)

(58) Field of Classification Search
CPC .. G06F 9/45516; G06F 9/5088; G06F 9/4856; G06F 9/4862; G06F 9/455; G06F 9/45504; G06F 9/45508; G06F 9/45537; G06F 9/3877; G06F 9/3879; G06F 9/3887; G06F 15/8007; G06F 8/52; G06F 2209/509; G06F 2009/4557; G06F 16/119; G06F 16/185; G06F 11/3636; G06F 11/3652
USPC ................ 712/22, 31, 34, 209, 227; 703/26; 717/136, 138, 140
See application file for complete search history.

(56) References Cited

U.S. PATENT DOCUMENTS

| | | | |
|---|---|---|---|
| 7,167,559 | B2 | 1/2007 | Ono et al. |
| 2008/0301415 | A1* | 12/2008 | Maeda .................... G06F 9/455 712/225 |
| 2009/0319662 | A1 | 12/2009 | Barsness et al. |
| 2010/0153686 | A1 | 6/2010 | Frank |
| 2010/0299130 | A1 | 11/2010 | Mitsuzawa et al. |
| 2014/0019723 | A1 | 1/2014 | Yamada et al. |
| 2014/0095832 | A1 | 4/2014 | Haber et al. |
| 2014/0281376 | A1 | 9/2014 | Yamada et al. |
| 2014/0375658 | A1 | 12/2014 | Lichmanov et al. |
| 2015/0012731 | A1 | 1/2015 | Hum et al. |
| 2015/0301848 | A1 | 10/2015 | Roehrig et al. |
| 2015/0301955 | A1* | 10/2015 | Yakovenko ............. G06F 12/14 711/163 |
| 2016/0026488 | A1* | 1/2016 | Bond .................... G06F 9/4552 718/1 |

FOREIGN PATENT DOCUMENTS

| | | |
|---|---|---|
| CN | 101901149 A | 12/2010 |
| CN | 101944077 A | 1/2011 |
| CN | 102193788 A | 9/2011 |
| CN | 102282540 A | 12/2011 |
| CN | 103294540 A | 9/2013 |
| CN | 104050010 A | 9/2014 |
| CN | 104572307 A | 4/2015 |
| GB | 2508433 A | 6/2014 |

OTHER PUBLICATIONS

WO2016202001, Gao et al. (Year: 2016).*
English Translation of WO2016202001 Specification (Year: 2016).*
Felix Xiaozhu Lin et al. K2: A Mobile Operating System for Heterogeneous Coherence Domains. ASPLOS '14, Mar. 1-4, 2014. total 15 pages.
Edson Bonin et al. Characterization of DBT Overhead. 2009 IEEE. pp. 178-187.
Giorgis Georgakoudis et al. Fast Dynamic Binary Rewriting for Flexible Thread Migration on Shared-ISA Heterogeneous MPSoCs, 2014 International Conference on Embedded Computer Systems: Architectures, Modeling, and Simulation (SAMOS XIV). pp. 156-163.
Giuseppe Coviello et al. A Coprocessor Sharing-Aware Scheduler for Xeon Phi-based Compute Clusters,2014 IEEE 28th International Parallel and Distributed Processing Symposium.pp. 337-346.
Yusuke Suzuki et al. GPUvm: Why Not Virtualizing GPUs at the Hypervisor? 2014 USENIX Annual Technical Conference.Jun. 19-20, 2014. pp. 109-120.
Rob Lyerly et al. Compiler Support for Application Migration in Heterogeneous-ISA Platforms,Eurosys. Apr. 2015.total 2 pages.
Takaaki Miyajima et al. Courier: A Toolchain for Application Acceleration on Heterogeneous Platforms, IPSJ Transactions on System LSI Design Methodology vol. 8 Aug. 2015. pp. 105-115.
Nabil Hallou et al. Dynamic Re-Vectorization of Binary Code. International Conference on Embedded Computer Systems: Architectures, Modeling, and Simulation (SAMOS XV). IEEE 2015. pp. 228-237.
Tong Li et al. Operating system support for overlapping-isa heterogeneous multi-core architectures, IEEE 2009. total 12 pages.
Toshio Suganuma et al. A Dynamic Optimization Framework for a Java Just-in-Time Compiler, ACM 2001. pp. 180-194.
Eric G. What public disclosures has Intel made about Knights Landing? Intel. Retrieve from the internet: https://software.intel.com/en-us/articles/what-disclosures-has-intel-made-about-knights-landing. Nov. 25, 2014. total 10 pages.

* cited by examiner

COMPUTER INSTRUCTION PROCESSING METHOD, COPROCESSOR, AND SYSTEM

CROSS-REFERENCE TO RELATED APPLICATIONS

This application is a continuation of International Application No. PCT/CN2016/073942, filed on Feb. 17, 2016, which claims priority to Chinese Patent Application No. 201510336409.5, filed on Jun. 17, 2015, both of which are hereby incorporated by reference in their entireties.

TECHNICAL FIELD

Embodiments of the present application relate to the field of computers, and in particular, to a computer instruction processing method, a coprocessor, and a system.

BACKGROUND

Currently, a coprocessor (coprocessor) is a chip and is mainly used to substitute for a central processing unit (CPU) to process a specific task. Because the coprocessor and the central processing unit have some differences in an instruction set, a program running on the coprocessor generally needs to be complied independently by using a compiler, and requires certain code adjustment. In the prior art, for codes of a certain application, labels are generally attached to the codes of the application, and the labels are used to distinguish which codes are executed by the CPU, and which codes are executed by the coprocessor. First, all codes of the application are compiled, which includes that codes executed by the CPU and codes executed by the coprocessor are compiled differently according to labels. After the codes are compiled, during running of a process of the application on the CPU, if the process runs to a compiled code that needs to be executed by the coprocessor, the CPU pauses the execution of the process of the application, sends, to the coprocessor, the compiled code that needs to be executed by the coprocessor, and offloads (offload) the code at the label to the coprocessor for execution.

As can be known from above, in the prior art, after compilation of the codes of the application is completed, which part of compiled codes are executed by the CPU and which compiled codes are executed by the coprocessor are definite, but any code cannot be sent to the coprocessor for execution according to a requirement. Consequently, actual usage of the coprocessor is low, and CPU load cannot be reduced properly.

SUMMARY

In view of this, the present application provide a computer instruction processing method, a coprocessor, and a system, where a CPU may migrate a computer instruction to a coprocessor running an operating system, so that the coprocessor executes the computer instruction to reduce CPU load.

According to a first aspect, the present application provides a computer instruction processing method, applied to a processor system, where the processor system includes a coprocessor and a central processing unit CPU, a first operating system runs on the CPU, and a second operating system runs on the coprocessor; and the method includes:

receiving, by the coprocessor, a first instruction set migrated by the CPU, where the first instruction set is used to instruct the CPU to execute computer operations in the first operating system, and the first instruction set is a set of binary codes that are applicable to the first operating system;

obtaining, by the coprocessor, a second instruction set according to the first instruction set, where binary codes in the second instruction set are used to instruct the coprocessor to execute the computer operations in the second operating system; and executing, by the coprocessor, the binary codes in the second instruction set.

With reference to the first aspect, in a first possible implementation manner, the obtaining, by the coprocessor, a second instruction set according to the first instruction set includes:

matching, by the coprocessor, in a preset translation table, operation codes of the binary codes in the first instruction set, and if an operation code of a first binary code in the first instruction set is found in the translation table, translating the operation code of the first binary code into an operation code of a second binary code according to a match item corresponding to the operation code of the first binary code in the translation table, obtaining the second binary code, and obtaining, by the coprocessor, the second instruction set according to at least one second binary code that is obtained, where the translation table includes a correspondence between different operation codes that are respectively generated for the first operating system and the second operating system by compiling a same computer instruction, and the second binary code is a binary code that is applicable to the second operating system.

With reference to the first aspect or the first possible implementation manner of the first aspect, in a second possible implementation manner, before the executing, by the coprocessor, the binary codes in the second instruction set, the method further includes:

translating, by the coprocessor, a register address of the CPU in the binary codes included in the second instruction set into a register address of the coprocessor.

With reference to the first possible implementation manner of the first aspect or the second possible implementation manner of the first aspect, in a third possible implementation manner, the obtaining, by the coprocessor, a second instruction set according to the first instruction set, further includes:

if an operation code of a third binary code in the first instruction set is not found in the translation table, using, by the coprocessor, the third binary code as a binary code in the second instruction set.

With reference to the first aspect or the first possible implementation manner of the first aspect or the second possible implementation manner of the first aspect or the third possible implementation manner of the first aspect, in a fourth possible implementation manner, the first instruction set is migrated to the coprocessor by the CPU when CPU usage of the CPU is greater than a first threshold.

With reference to the fourth possible implementation manner of the first aspect, in a fifth possible implementation manner, the receiving, by the coprocessor, a first instruction set migrated by the CPU includes:

receiving, by the coprocessor, an address of the to-be-migrated first instruction set that is sent by the CPU, where the address of the first instruction set is a storage address of the first instruction set in a memory of the CPU, and the address of the first instruction set is sent to the coprocessor by the CPU when memory usage of the CPU is less than or equal to a second threshold; and acquiring, by the coprocessor, the first instruction set by accessing the memory of the CPU based on the address of the first instruction set.

With reference to the first aspect or the first possible implementation manner of the first aspect or the second possible implementation manner or the third possible implementation manner of the first aspect, in a sixth possible implementation manner, the first instruction set is sent to the coprocessor by the CPU when memory usage of the CPU is greater than a second threshold.

With reference to the first aspect or the first possible implementation manner of the first aspect or the second possible implementation manner or the third possible implementation manner of the first aspect or the fourth possible implementation manner of the first aspect or the fifth possible implementation manner or the sixth possible implementation manner of the first aspect, in a seventh possible implementation manner, the executing, by the coprocessor, the binary codes in the second instruction set includes:

executing, by the coprocessor, the binary codes in the second instruction set in sequence;

if a binary code identification exception is detected during execution of the second instruction set, determining a fourth binary code that triggers the exception;

translating the fourth binary code into an intermediate code, and then translating the intermediate code into a fifth binary code that is applicable to the second operating system; and executing the fifth binary code, and continuing to execute a binary code after the fourth binary code in the second instruction set.

With reference to the seventh possible implementation manner of the first aspect, in an eighth possible implementation manner, before the translating the fourth binary code into an intermediate code, the method further includes:

sending an instruction set back-migration request to the CPU; and receiving a back-migration reject instruction sent by the CPU.

With reference to the first aspect or the first possible implementation manner of the first aspect or the second possible implementation manner or the third possible implementation manner of the first aspect or the fourth possible implementation manner of the first aspect or the fifth possible implementation manner or the sixth possible implementation manner of the first aspect, in a ninth possible implementation manner, the executing, by the coprocessor, the binary codes in the second instruction set includes:

executing, by the coprocessor, the binary codes in the second instruction set in sequence;

if a binary code identification exception is detected during execution of the second instruction set, determining a sixth binary code that triggers the exception; and acquiring, according to binary codes starting from the sixth binary code in the second instruction set, a third instruction set that is applicable to the first operating system, and migrating the third instruction set to the CPU.

With reference to the ninth possible implementation manner of the first aspect, in a tenth possible implementation manner, before the acquiring, according to binary codes starting from the sixth binary code in the second instruction set, a third instruction set that is applicable to the first operating system, the method further includes:

sending an instruction set back-migration request to the CPU; and receiving an instruction set back-migration response sent by the CPU.

According to a second aspect, the present application provides a coprocessor, applied to a processor system, where the processor system includes the coprocessor and a central processing unit CPU that runs a first operating system, where a second operating system runs on the coprocessor; and the coprocessor includes:

a first instruction set receiving unit, configured to receive a first instruction set migrated by the CPU, where the first instruction set is used to instruct the CPU to execute computer operations in the first operating system, and the first instruction set is a set of binary codes that are applicable to the first operating system;

a second instruction set obtaining unit, configured to obtain a second instruction set according to the first instruction set, where binary codes in the second instruction set are used to instruct the coprocessor to execute the computer operations in the second operating system; and a second instruction set execution unit, configured to execute the binary codes in the second instruction set.

With reference to the second aspect, in a first possible implementation manner, that the second instruction set obtaining unit is configured to obtain a second instruction set according to the first instruction set includes:

the second instruction set obtaining unit is configured to match, in a preset translation table, operation codes of the binary codes in the first instruction set, and if an operation code of a first binary code in the first instruction set is found in the translation table, translate the operation code of the first binary code into an operation code of a second binary code according to a match item corresponding to the operation code of the first binary code in the translation table, obtain the second binary code, and obtain the second instruction set according to at least one second binary code that is obtained, where the translation table includes a correspondence between different operation codes that are respectively generated for the first operating system and the second operating system by compiling a same computer instruction, and the second binary code is a binary code that is applicable to the second operating system.

With reference to the second aspect or the first possible implementation manner of the second aspect, in a second possible implementation manner, the coprocessor further includes:

a register address translation unit, configured to translate a register address of the CPU in the binary codes included in the second instruction set into a register address of the coprocessor.

With reference to the first possible implementation manner of the second aspect or the second possible implementation manner of the second aspect, in a third possible implementation manner, the second instruction set obtaining unit is further configured to: if an operation code of a third binary code in the first instruction set is not found in the translation table, use, by the coprocessor, the third binary code as a binary code in the second instruction set.

With reference to the second aspect or the first possible implementation manner of the second aspect or the second possible implementation manner or the third possible implementation manner of the second aspect, in a fourth possible implementation manner, the first instruction set is migrated to the coprocessor by the CPU when CPU usage of the CPU is greater than a first threshold.

With reference to the fourth possible implementation manner of the second aspect, in a fifth possible implementation manner, that the first instruction set receiving unit is configured to receive a first instruction set migrated by the CPU includes:

the first instruction set receiving unit is configured to receive an address of the to-be-migrated first instruction set that is sent by the CPU, and acquire the first instruction set by accessing a memory of the CPU based on the address of the first instruction set, where the address of the first instruction set is a storage address of the first instruction set in the memory of the CPU, and the address of the first instruction set is sent to the coprocessor by the CPU when memory usage of the CPU is less than or equal to a second threshold.

With reference to the second aspect or the first possible implementation manner of the second aspect or the second possible implementation manner or the third possible implementation manner of the second aspect, in a sixth possible implementation manner, the first instruction set is sent to the coprocessor by the CPU when memory usage of the CPU is greater than a second threshold.

With reference to the second aspect or the first possible implementation manner of the second aspect or the second possible implementation manner or the third possible implementation manner of the second aspect or the fourth possible implementation manner of the second aspect or the fifth possible implementation manner or the sixth possible implementation manner of the second aspect, in a seventh possible implementation manner, that the second instruction set execution unit is configured to execute the binary codes in the second instruction set includes:

the second instruction set execution unit is configured to: execute the binary codes in the second instruction set in sequence; and if a binary code identification exception is detected during execution of the second instruction set, determine a fourth binary code that triggers the exception, translate the fourth binary code into an intermediate code, then translate the intermediate code into a fifth binary code that is applicable to the second operating system, execute the fifth binary code, and continue to execute a binary code after the fourth binary code in the second instruction set.

With reference to the seventh possible implementation manner of the second aspect, in an eighth possible implementation manner, the second instruction set execution unit is further configured to: before translating the fourth binary code into the intermediate code, send an instruction set back-migration request to the CPU, and receive a back-migration reject instruction sent by the CPU.

With reference to the second aspect or the first possible implementation manner of the second aspect or the second possible implementation manner or the third possible implementation manner of the second aspect or the fourth possible implementation manner of the second aspect or the fifth possible implementation manner or the sixth possible implementation manner of the second aspect, in a ninth possible implementation manner, that the second instruction set execution unit is configured to execute the binary codes in the second instruction set includes:

the second instruction set execution unit is configured to: execute the binary codes in the second instruction set in sequence; if a binary code identification exception is detected during execution of the second instruction set, determine a sixth binary code that triggers the exception; and acquire, according to binary codes starting from the sixth binary code in the second instruction set, a third instruction set that is applicable to the first operating system, and migrate the third instruction set to the CPU.

With reference to the ninth possible implementation manner of the second aspect, in a tenth possible implementation manner, the second instruction set execution unit is further configured to: before acquiring, according to the binary codes starting from the sixth binary code in the second instruction set, the third instruction set that is applicable to the first operating system, send an instruction set back-migration request to the CPU, and receive an instruction set back-migration response sent by the CPU.

According to a third aspect, the present application provides a coprocessor, where the coprocessor is connected to a memory by using a bus, the memory is configured to store a computer execution instruction, and the coprocessor reads the computer execution instruction stored in the memory to execute the computer instruction processing method according to the first aspect or any possible implementation manner of the first aspect.

According to a fourth aspect, the present application provides a processor system, where the processor system includes a central processing unit CPU and a coprocessor, a first operating system runs on the CPU, and a second operating system runs on the coprocessor, where the CPU is configured to migrate a first instruction set to the coprocessor; and the coprocessor is configured to execute the computer instruction processing method according to the first aspect or any possible implementation manner of the first aspect.

In the foregoing solutions, for a first instruction set that is obtained through compilation and is applicable to a first operating system for execution, a coprocessor acquires, according to the first instruction set, a second instruction set for execution in the coprocessor. In this way, the coprocessor that executes the second instruction set substitutes for a CPU that executes the first instruction set, CPU load is reduced, and usage of the coprocessor is improved.

DESCRIPTION OF EMBODIMENTS

The following clearly describes the technical solutions in the embodiments of the present application with reference to the accompanying drawings in the embodiments of the present application.

Figure 1:
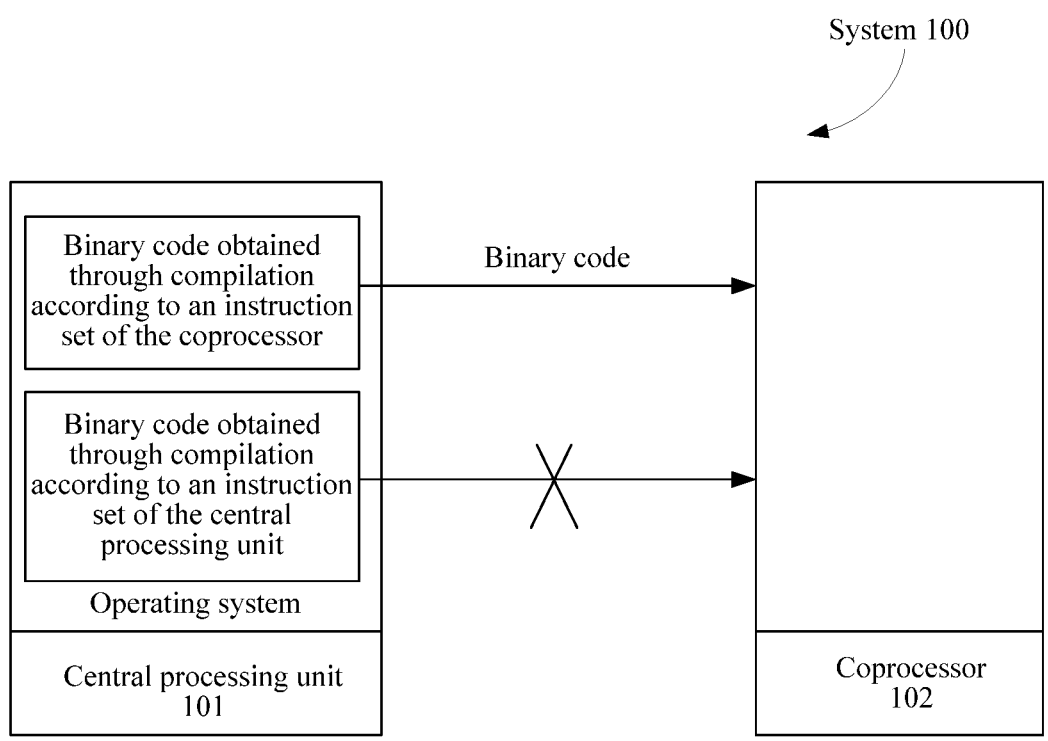
FIG. 1 is a schematic diagram of a logical structure of a system in an application scenario in which a compiled binary code is allocated according to the prior art.

Referring to FIG. 1, FIG. 1 shows a system 100 provided in the prior art. The system 100 includes a central processing unit (CPU) 101 and a coprocessor 102, where an instruction set supported by the central processing unit 101 is different from an instruction set supported by the coprocessor 102. In addition, an operating system (for example, an operating system that supports an X86 instruction set) is installed on the central processing unit 101, but no operating system is installed on the coprocessor 102. When source code of a program running on the central processing unit 101 is compiled, source code to be processed by the coprocessor 102 is compiled according to the instruction set of the coprocessor 102, and a binary code obtained through compilation is identifiable and executable by the coprocessor 102, but there may be a binary code that is unidentifiable by the central processing unit 101; source code to be processed by the central processing unit 101 is compiled according to the instruction set of the central processing unit 101, and a binary code obtained through compilation is identifiable and executable by the central processing unit 101, but there may be a binary code that is unidentifiable by the coprocessor 102. Therefore, even if load of the central processing unit 101 is heavy, the coprocessor 102 cannot substitute for the central processing unit 101 to execute the binary code to be executed by the central processing unit 101.

Figure 2:
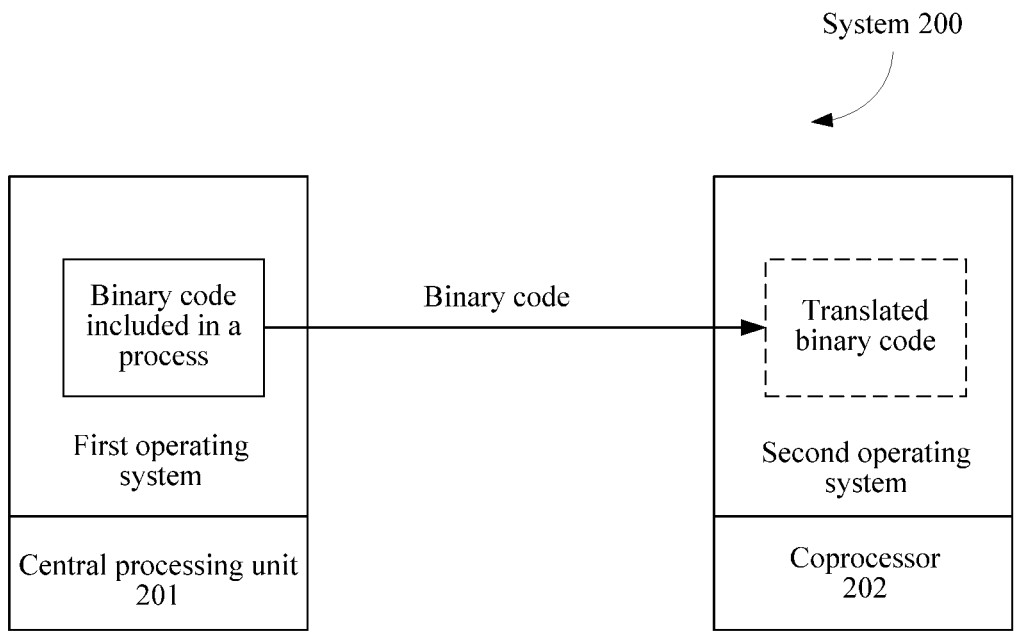
FIG. 2 is a schematic diagram of a logical structure of a system in an application scenario of a computer instruction processing method.

Referring to FIG. 2, FIG. 2 shows a system 200 provided by an embodiment of the present application. The system 200 includes a central processing unit 201 and a coprocessor 202. The coprocessor 202 has a control capability. The central processing unit 201 and the coprocessor 202 respectively run an operating system. In comparison with the prior art in which no operating system is installed on the coprocessor 102, an operating system is installed on the coprocessor 202 in the present application, a process may run on the coprocessor 202, and the operating system of the coprocessor 202 may perform process scheduling. In this way, the central processing unit 201 and the coprocessor 202 may migrate processes to each other.

Optionally, the system 200 may be located on one data processing device. Positions in which the central processing unit 201 and the coprocessor 202 included in the system 200 are disposed on the data processing device are not limited in this embodiment of the present application. The central processing unit 201 is connected to the coprocessor 202. How a connection between the central processing unit 201 and the coprocessor 202 included in the system 200 is implemented on the data processing device is not limited in this embodiment of the present application. After being connected, the central processing unit 201 and the coprocessor 202 may transmit data to each other.

For example, the data processing device includes a bus. The central processing unit 201 and the coprocessor 202 included in the system 200 are both connected to the bus. The central processing unit 201 exchanges data with the coprocessor 202 by using the bus. If the bus meets a requirement for data transmission between the central processing unit 201 and the coprocessor 202, a specific type of the bus and a supported bus protocol are not limited, where the requirement for data transmission includes a data transmission speed and a data transmission format. In addition, with development of the times, the central processing unit 201 and the coprocessor 202 included in the system 200 may be connected by using another medium, and the medium is used to increase a speed of data exchange between the central processing unit 201 and the coprocessor 202. In specific implementation, the medium may be used to replace the bus for connecting the central processing unit 201 to the coprocessor 202, or the medium and the bus coexist and are both used to exchange data between the central processing unit 201 and the coprocessor 202.

For example, in the system 200, the central processing unit 201 is implemented by using an X86 processor, and the coprocessor 202 is implemented by using an Intel many integrated core (MIC) architecture. The X86 processor is connected to the MIC by using a peripheral component interconnect express (PCI-E) bus, and the X86 processor exchanges data with the MIC by using the PCI-E bus.

Optionally, the central processing unit 201 and the coprocessor 202 in the system 200 are not located in a same device, the central processing unit 201 is communicatively connected to the coprocessor 202, and the central processing unit 201 exchanges data with the coprocessor 202 by using messages.

Referring to FIG. 2, in an application scenario of a computer instruction processing method provided by the present application, an instruction set supported by the central processing unit 201 and an instruction set supported by the coprocessor 202 include some different computer instructions, a first operating system running on the central processing unit 201 supports the instruction set of the central processing unit 201, and the second operating system running on the coprocessor 202 supports the instruction set of the coprocessor 202; if the first operating system is the same as the second operating system, the first operating system and the second operating system both support the instruction set of the central processing unit 201 and the instruction set of the coprocessor 202; if the first operating system does not support the instruction set of the coprocessor 202, or the second operating system does not support the instruction set of the central processing unit 201, the first operating system and the second operating system are different operating systems.

Relative to the instruction set supported by the coprocessor 202, the instruction set supported by the central processing unit 201 may be divided into three parts of instruction subsets, including a first part of instruction subsets, a second part of instruction subsets, and a third part of instruction subsets.

Figure 3:
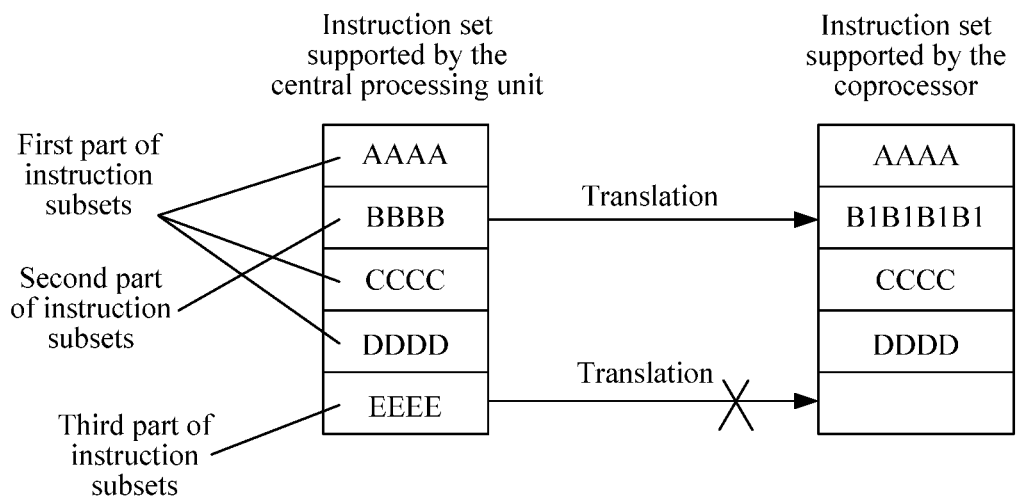
FIG. 3 is a schematic diagram of a correspondence between computer instructions in an instruction set of a central processing unit and computer instructions in an instruction set of a coprocessor.

For each computer instruction included in the first part of instruction subsets, the same computer instruction is also included in the instruction set of the coprocessor 202; in addition, a binary code supported by the central processing unit 201 and representing the computer instruction is the same as a binary code supported by the coprocessor 202 and representing the computer instruction. Using FIG. 3 as an example, a binary code "AAAA" represents a computer instruction in the first part of instruction subsets, and the instruction set supported by the coprocessor also includes the computer instruction, and in addition, the binary code "AAAA" also represents the computer instruction in the instruction set supported by the coprocessor; similar to the binary code "AAAA", a binary code "CCCC" and a binary code "DDDD" that represent two other computer instructions in the first part of instruction subsets also represent the two computer instructions included in the instruction set of the coprocessor.

For each computer instruction included in the second part of instruction subsets, the same computer instruction is also included in the instruction set of the coprocessor 202; however, a binary code supported by the central processing unit 201 and representing the computer instruction is different from a binary code supported by the coprocessor 202 and representing the computer instruction. Using FIG. 3 as an example, a binary code "BBBB" represents a certain computer instruction in the second part of instruction subsets, and the instruction set supported by the coprocessor also includes the computer instruction; however, a binary code supported by the coprocessor and representing the computer instruction is "B1B1B1B1", and "BBBB" and "B1B1B1B1" are different binary codes.

Each computer instruction included in the third part of instruction subsets is not included in the instruction set of the coprocessor 202. Using FIG. 3 as an example, a binary code "EEEE" represents a certain computer instruction in the third part of instruction subsets, and the instruction set of the coprocessor does not include the computer instruction; therefore, for the binary code "EEEE", a binary code corresponding to the computer instruction cannot be found in the instruction set of the coprocessor.

In this embodiment of the present application, if the central processing unit 201 migrates a process to the coprocessor 202, the coprocessor 202 receives data that is related to the process and migrated by the central processing unit 201, where the data includes binary codes required for executing the process and further includes a process status of the process or the like. In each binary code required for executing the process, an operation code of the binary code is a binary code representing a computer instruction, and the binary code may further include an operand, where the operand is also represented by a binary code.

For a computer instruction in the second part of instruction subsets, a binary code supported by the central processing unit 201 and representing the computer instruction is different from a binary code supported by the coprocessor 202 and representing the computer instruction. In view of this, in the computer instruction processing method provided by the present application, a translation table is created for the second part of instruction subsets, and binary code translation is performed by using the translation table, so that a binary code supported by the central processing unit 201 and representing a computer instruction in the second part of instruction subsets is translated into a binary code supported by the coprocessor and representing the computer instruction. In this way, the coprocessor 202 can identify a translated binary code, and during running of the migrated process, execute the translated binary code to implement a function of a computer instruction. For each computer instruction included in the third part of instruction subsets, a binary code representing the computer instruction cannot be identified in the computer instruction processing method provided by the present application, and an exception that the binary code cannot be identified (an operation code of the binary code is a binary code representing the computer instruction) occurs. In this case, there are two solutions.

A first solution is to migrate the process back to the central processing unit 201.

A second solution is to first translate the binary code that triggers the exception into one or more intermediate codes, then translate each intermediate code into a binary code supported by the coprocessor 202, and starting from the translated binary code, continue to run the process. Optional specific implementation through intermediate code translation is: determining, according to an operation code (which belongs to a binary code representing a computer instruction in the third part of instruction subsets) in the binary code that triggers the exception, an operation code represented by each intermediate code, and if an operand is represented by an intermediate code, determining, according to an operand in the binary code that triggers the exception, an operand represented by the intermediate code and corresponding to each operation code; then determining, according to the operation code represented by the intermediate code, each operation code in the binary code supported by the coprocessor 202; and determining, according to the operand represented by the intermediate code, the operand corresponding to each operation code in the binary code supported by the coprocessor 202.

Optionally, the central processing unit 201 is set as a first-choice device for executing the process, and the coprocessor 202 is set as a second-choice device for executing the process. First, the central processing unit 201 executes the process. If one of the following case occurs during execution of the process, the process is migrated to the coprocessor 202, including:

In a first case, during execution of the process, when a binary code to be executed by the coprocessor 202 is identified, the central processing unit 201 migrates the process to the coprocessor 202, and the coprocessor 202 runs the process to execute the binary code; optionally, the coprocessor 202 feeds back an execution result of the process to the central processing unit 201.

In a second case, when CPU usage of the central processing unit 201 is excessively high, one or more processes are screened out (for example, a process with highest CPU usage is screened out); the process that is screened out is migrated to the coprocessor 202; and the coprocessor 202 translates, according to the translation table, binary codes required for executing the process, and then executes translated binary codes to run the process. A translation action is specifically: performing traversal matching and search for the binary codes required for executing the process, and optionally, performing traversal matching and search sequentially according to an execution sequence of the binary codes, to match and find whether any binary code supported by the central processing unit 201 and recorded in the translation table exists; and if a binary code is matched and found, replacing the found binary code, according to the translation table, with a binary code supported by the coprocessor 202 and representing a same computer instruction.

In a third case, when memory usage of a memory used by the central processing unit 201 is excessively high, one or more processes are screened out (for example, a process with highest memory usage is screened out); the process that is screened out is migrated to the coprocessor 202; and the coprocessor 202 translates, according to the translation table, binary codes required for executing the process, and then executes the process after translation.

In an embodiment of the present application, how a coprocessor runs a process migrated from a CPU is described in detail. For ease of description, for example, the coprocessor is implemented by using a MIC, and the central processing unit is implemented by using an X86 processor. The X86 processor is connected to the MIC by using a PCI-E bus. A general-purpose operating system (for example, an operating system that supports an X86 instruction set) runs on the X86 processor. A customized uOS operating system runs on the MIC. The X86 processor and the MIC respectively have independent memories and registers.

In this embodiment, the register of the X86 processor is a 128-bit register. For example, the X86 processor includes sixteen 128-bit XMM registers, where the XMM register is a vector register and supports a Streaming SIMD Extensions, (SSE) instruction set. A Chinese name of the SIMD is single-instruction [stream] multiple-data stream, and a full English name of the SIMD is Single Instruction Multiple Data. That is, the X86 processor may use the SSE instruction set to operate an XMM register group to perform a 128-bit vector operation. Alternatively, the register of the X86 processor is a 256-bit register. For example, the X86 processor includes sixteen 256-bit YMM registers, where the YMM register is a vector register and supports an advanced vector extensions (AVX) instruction set. That is, the X86 processor may use the AVX instruction set to operate a YMM register group to perform a 256-bit vector operation, for example, operate the YMM register group to perform a floating-point operation.

The register of the MIC is a 512-bit register. For example, the MIC includes thirty-two 512-bit ZMM registers, where the ZMM register is a vector register, and a ZMM register group may be operated to perform a 512-bit vector operation. In addition, the register of the MIC also supports the SSE instruction set and the AVX instruction set.

In this embodiment, in order that the MIC is compatible with an operation of a register operated by the X86 processor, the MIC selects 16 registers from the 32 registers, supports a 128-bit operation (for example, supports an operation of the SSE instruction set), and supports a 256-bit operation (for example, supports an operation of the AVX instruction set); optionally, the MIC uses low 256 bits of sixteen 512-bit registers, and performs a 128-bit operation or performs a 256-bit operation to get compatible with an operation of a register operated by the X86 processor. In this way, for a process migrated by the X86 processor, the MIC replaces a binary code representing a register of the X86 processor, in binary codes that are required for executing the process, with a binary code representing a register selected by the MIC, that is, a binary code pointing to a register of the X86 processor is replaced with a binary code pointing to a register selected by the MIC, and the register of the MIC may be used to perform an operation without making any bit adjustment and operation rule adjustment for operation data. For example, the MIC replaces a binary code representing an XMM register of the X86 processor, in the binary codes migrated by the X86 processor, with a binary code representing a register selected by the MIC, and the MIC executes a binary code representing a computer instruction in the SSE instruction set, and operates 16 registers selected by the MIC to perform a 128-bit vector operation. For another example, the MIC replaces a binary code representing a YMM register of the X86 processor, in the binary codes migrated by the X86 processor, with a binary code representing a register selected by the MIC, and the MIC executes a binary code representing a computer instruction in the AVX instruction set, and operates 16 registers selected by the MIC to perform a 256-bit vector operation.

In this way, for the process migrated from the X86 processor to the MIC, after the MIC replaces the binary code representing the register of the X86 processor, in the binary codes required for executing the process, with the binary code representing the register selected by the MIC, the register of the MIC is used to run the migrated process.

In addition, in this embodiment, a translation table is created, and matching is performed in the translation table by the MIC. Specifically, the translation table is created for the computer instructions included in the foregoing second part of instruction subsets. This is because the binary codes supported by the X86 processor and representing the computer instructions are different from the binary codes supported by the MIC and representing the computer instructions. A method for creating the translation table is: respectively adding, in the translation table, the binary codes supported by the X86 processor and representing the computer instructions and the binary codes supported by the MIC and representing the computer instructions, and determining, in the translation table, mapping relationships between the binary codes supported by the X86 processor and representing the computer instructions and the binary codes supported by the MIC and representing the computer instructions. As an example of the translation table, Table 1 lists five computer instructions as follows:

TABLE 1

| Computer instruction | Binary code supported by the X86 processor | Binary code supported by the MIC |
|---|---|---|
| FXSAVE | "01111011110111010000" | "00001111101011101111" |
| FXRSTOR | "11011101" | "00001111101011100001" |
| RDPMC | "0000111100110001" and "0000111100110010" | "0000111100110011" |
| FSUB | "1101100011100000" | "0000111101011100" |

"FXSAVE" in Table 1 is an instruction for saving a floating point status, and is used to save a status of a floating-point operation unit (FPU) register. A binary code supported by the X86 processor and representing "FXSAVE" is "01111011110111010000". A binary code supported by the MIC and representing "FXSAVE" is "00001111101011101111".

"FXRSTOR" in Table 1 is an instruction for restoring the floating point status, and is used to restore the saved status of the FPU register to the FPU register. A binary code supported by the X86 processor and representing "FXRSTOR" is "11011101". A binary code supported by the MIC and representing "FXRSTOR" is "00001111101011100001".

"RDPMC" in Table 1 is an instruction for reading a performance monitoring counter, and is used to read a performance monitoring counter. There are two binary codes supported by the X86 processor and representing "RDPMC", which include "0000111100110001" and "0000111100110010". There is only one binary code supported by the MIC and representing "RDPMC", which is "0000111100110011".

"FSUB" in Table 1 is a floating-point subtraction instruction, and is used to perform a subtraction operation on a floating-point number. A binary code supported by the X86 processor and representing "FSUB" is "1101100011100000". A binary code supported by the MIC and representing "FSUB" is "0000111101011100".

In this way, after the translation table is loaded into the uOS operating system running on the MIC, for the data that is related to the process and acquired by the MIC from the X86 processor during migration of the process from the X86 processor to the MIC, the binary codes required for executing the process are extracted from the data related to the process, and in the binary codes, binary codes corresponding to computer instructions included in the second part of instruction subsets are matched and replaced according to the translation table, and replaced with binary codes supported by the MIC and representing the computer instructions in the translation table, and then the MIC can identify the replaced binary codes. Therefore, accuracy and efficiency of executing the migrated process by the MIC are improved to some extent.

In this embodiment, there are two conditions for triggering the X86 processor to migrate a process to the MIC. One condition is that CPU usage of the X86 processor is detected to be greater than a first threshold. The other condition is that memory usage of a memory used by the X86 processor is detected to be greater than a second threshold. In specific implementation, the operating system of the X86 processor runs a code segment to implement a monitoring module, and uses the monitoring module to detect load of the X86 processor, which includes: detecting CPU usage of the X86 processor, and detecting memory usage of the memory used by the X86 processor. When the monitoring module detects that either of the foregoing two conditions is met, one certain or more processes are suspended, memory space used by the process is locked, and the process is migrated to the MIC.

When the X86 processor migrates a process to the MIC, if migration of the process from the X86 processor to the MIC is triggered because memory usage of the memory used by the X86 processor is greater than the second threshold, data related to the process in the memory used by the X86 processor is sent to the MIC, regardless of whether CPU usage of the X86 processor is greater than the first threshold. Correspondingly, the MIC stores the received data related to the process in the memory used by the MIC, and then extracts, from the data related to the process and stored in the memory of the MIC, binary codes required for executing the process. If a binary code (a binary code corresponding to a computer instruction included in the second part of instruction subsets) supported by the CPU in the translation table is found in all the extracted binary codes, the binary code is replaced with a binary code supported by the MIC and representing the computer instruction in the translation table, and the replaced binary code is updated and stored to the memory of the MIC. In this way, all the binary codes stored in the memory of the MIC and corresponding to the computer instructions included in the second part of instruction subsets are replaced, according to the translation table, with the binary codes supported by the MIC and representing the computer instructions.

When the X86 processor migrates the process to the MIC, if migration of the process from the X86 processor to the MIC is triggered because CPU usage of the X86 processor is greater than the first threshold and memory usage of the memory used by the X86 processor is less than or equal to the second threshold, a storage address for storing the data related to the process in the memory of the X86 processor is sent to the MIC. Correspondingly, the MIC divides a storage space from the memory used by the MIC, and establishes an address mapping relationship between a storage address included in the storage space and the received storage address (the storage address for storing the data related to the process in the memory of the X86 processor). Then, the MIC accesses, according to the address mapping relationship by using the PCI-E bus, the data related to the process in the memory of the X86 processor, and extracts, from the data related to the process, the binary codes required for executing the process. If a binary code (a binary code corresponding to a computer instruction included in the second part of instruction subsets) supported by the CPU in the translation table is found in the extracted binary codes, the binary code is replaced with a binary code supported by the MIC in the translation table, and the replaced binary code is updated and stored to the memory of the X86 processor. In this way, all the binary codes stored in the memory of the X86 processor and corresponding to the computer instructions included in the second part of instruction subsets are replaced, according to the translation table, with the binary codes supported by the MIC and representing the computer instructions. Further, the MIC uses the memory of the CPU according to the address mapping relationship to run the process.

The following describes specific implementation about how the MIC translates a binary code according to the translation table:

The uOS operating system of the MIC runs a code segment to implement a translation module, and the translation module loads the translation table.

For each process migrated by the X86 processor, the translation module executes all binary codes required for executing the process, and matches and finds whether any binary code supported by the X86 processor exists in the translation table, and every time a binary code is matched and found, translates, according to the translation table, the binary code into a binary code supported by the MIC, until traversal search is completed.

For example, for an exclusive OR instruction (XOR), a binary code supported by the X86 processor varies with a compared object. If two register values are compared, the binary code supported by the X86 processor for the exclusive OR instruction is represented by "0011001". If a register value and a value stored in the memory are compared, the binary code supported by the X86 processor for the exclusive OR instruction is represented by "0011000". However, binary codes supported by the MIC for the exclusive OR instruction (XOR) are all represented by "0011000". In order that the MIC can identify and compare the exclusive OR instructions of the two register values, a mapping relationship between "0011001" and "0011000" is recorded in the translation table. If the translation module matches and finds, according to the translation table, "0011001" from the binary codes included in the process migrated by the X86 processor, the translation module replaces "0011001" in the binary codes included in the process with "0011000" according to the translation table.

For another example, for the "RDPMC" instruction for reading a performance monitoring counter, binary codes supported by the X86 processor for the "RDPMC" instruction are "0000111100110001" and "0000111100110010". There is only one binary code supported by the MIC and representing "RDPMC", which is "0000111100110011". Therefore, a mapping relationship between "0000111100110001" and "0000111100110011" is recorded in the translation table, and a mapping relationship between "0000111100110010" and "0000111100110011" is recorded in the translation table. If the translation module matches and finds, according to the translation table, "0000111100110001" from the binary codes included in the process migrated by the X86 processor, the translation module replaces "0000111100110001" in the binary codes included in the process with "0000111100110011" according to the translation table. If the translation module matches and finds, according to the translation table, "0000111100110010" from the binary codes included in the process migrated by the X86 processor, the translation module replaces "0000111100110010" in the binary codes included in the process with "0000111100110011" according to the translation table.

In this embodiment, during migration of the process from the X86 processor to the MIC, the MIC not only acquires the data related to the process from the memory used by the X86 processor, but also acquires a register value related to the process from the register of the X86 processor, and dumps the acquired register value to a corresponding register of the MIC. When the MIC runs the process, the MIC first extracts a process status of the process from the data related to the process and stored in the memory of the MIC, where the process status includes status information necessary for running of the process, such as a process priority, a process identifier, and a stack pointer. Then, starting from a process running node that is determined according to the process status, the MIC uses the register of the MIC, and executes the process based on the data (the data includes the binary codes translated according to the translation table) related to the process and stored in the memory of the MIC.

In this embodiment, the uOS operating system of the MIC runs a code segment to implement an exception handling module, and the exception handling module can intercept an exception that occurs in a process executed by the MIC, including an exception triggered because the process runs to an unidentifiable binary code. Optionally, during execution of the process by the MIC, if the exception handling module detects that execution of the process is exceptional, the exception handling module suspends the process, and generates and records exception information about exceptional execution of the process.

For example, binary codes of the computer instructions included in the foregoing third part of instruction subsets are not included in the instruction set of the MIC, and the MIC cannot identify the binary codes corresponding to the computer instructions; in addition, the translation table also does not record the binary codes of the computer instructions included in the third part of instruction subsets, and the binary codes of the computer instructions included in the third part of instruction subsets cannot be translated, according to the translation table, into the binary codes corresponding to the computer instructions in the instruction set of the MIC. Therefore, the MIC cannot identify a binary code that uses the binary code as an operation code. If the process runs to the binary code, an exception that the binary code cannot be identified is triggered.

The exception handling module detects a process execution exception triggered by an instruction identification exception, suspends the process, and uses the following three optional exception handling manners to perform exception handling:

In a first manner, starting from the binary code that triggers the exception, the exception handling module migrates the suspended process back to the X86 processor, which specifically includes: performing, according to the translation table, operation code (represented by the binary code) matching on the binary codes required for executing the back-migrated process in the memory (which may be the memory of the MIC or the memory of the X86 processor), translating the found binary code into a binary code supported by the X86 processor, and using the translated binary code to update the corresponding binary code in the memory. If the updated binary codes required for executing the back-migrated process are stored in the memory of the MIC, the updated binary codes required for executing the back-migrated process are dumped to the memory of the X86 processor. A dumping implementation manner is: dumping, by means of data communication between the MIC and the X86 processor, the updated binary codes required for executing the back-migrated process and stored in the memory of the MIC, to the memory of the X86 processor. In addition, a binary code representing a register of the MIC in the binary codes required for executing the back-migrated process is replaced with a binary code representing a register of the X86 processor, and the replaced binary code is used to update the binary code stored in the memory and representing the register of the MIC; in addition, a register value related to the back-migrated process and stored in the register of the MIC is dumped to the register of the X86 processor. In this way, the X86 processor may use its register and memory to run the back-migrated process.

In a second manner, the exception handling module determines whether the suspended process belongs to the process migrated by the X86 processor to the MIC; if the suspended process belongs to the process migrated by the X86 processor to the MIC, the exception handling module identifies the binary code that triggers the exception, and translates the binary code that triggers the exception into an intermediate code of a simulator (such as a simics simulator or a qemu simulator), then translates the intermediate code into a binary code supported by the MIC, and continues to execute the process starting from the binary code obtained through translation.

In a third manner, the exception handling module sends a process back-migration request to the X86 processor, to notify the X86 processor that back-migration of the process that is currently executed exceptionally is expected; the X86 processor responds to the process back-migration request, and determines usage of the X86 processor currently monitored by the monitoring module and memory usage of the memory of the X86 processor currently monitored. If a determining result of the X86 processor is that the usage of the X86 processor is less than the first threshold, and that the memory usage of the memory of the X86 processor is less than or equal to the second threshold, the X86 processor feeds back a process back-migration instruction to the MIC; if a determining result of the X86 processor is that the usage of the X86 processor is greater than the first threshold, or if a determining result of the X86 processor is that the memory usage of the memory of the X86 processor is greater than the second threshold, the X86 processor feeds back a process back-migration reject instruction to the MIC.

In the third manner, if the exception handling module receives the process back-migration instruction fed back by the X86 processor, the exception handling module migrates the suspended process back to the X86 processor. An implementation manner of migrating the process from the MIC back to the X86 processor is the same as the foregoing first implementation manner, and is not further described herein.

In the third manner, if the exception handling module receives the back-migration reject instruction fed back by the X86 processor, the exception handling module does not migrate the suspended process back to the X86 processor, and determines whether the suspended process belongs to the process migrated by the X86 processor to the MIC; if the suspended process belongs to the process migrated by the X86 processor to the MIC, the exception handling module identifies the binary code that triggers the exception, and translates the binary code that triggers the exception into an intermediate code of a simulator (such as a simics simulator or a qemu simulator), then translates the intermediate code into a binary code supported by the MIC, and continues to execute the process starting from the binary code obtained through translation. Optionally, if the suspended process does not belong to the process migrated by the X86 processor to the MIC, the MIC directly outputs exception information, where a reason why the suspended process does not belong to the process migrated by the X86 processor to the MIC may be: the X86 processor has a process, a code segment that needs to be executed by the MIC is identified during execution of the process, and the code segment is executed by the MIC instead, but the MIC creates a new process to execute the code segment and an exception occurs.

In this embodiment, the following computer instructions supported by the X86 processor are not supported by the MIC, including the following 22 computer instructions: a conditional move instruction "CMOV", an instruction "CMPXCHG16B" for comparing and exchanging 16 bytes, a floating-point conditional move instruction "FCMOVcc", an instruction "FCOMI" for comparing floating-point values and setting load flags, an instruction "FCOMIP" for comparing floating-point values, setting load flags, and popping, an instruction "FUCOMI" for inversely comparing floating-point values and setting load flags, an instruction "FUCOMIP" for inversely comparing floating-point values, setting load flags, and popping, an instruction "IN" for inputting from a port, an instruction "INS" for inputting a string from a port, an instruction "INSB" for inputting a byte string from a port, an instruction "INSD" for inputting a doubleword string from a port, an instruction "INSW" for inputting a word string from a port, a monitoring instruction "MONITOR", a thread synchronization instruction "MWAIT", an instruction "OUT" for outputting to a port, an instruction "OUTS" for outputting a string to a port, an instruction "OUTSB" for outputting a byte string to a port, an instruction "OUTSD" for outputting a doubleword to a port, an instruction "OUTSW" for outputting a word string to a port, a pause instruction "PAUSE", a system entry instruction "SYSENTER", and a system exit instruction "SYSEXIT"; the 22 computer instructions may be classified into three types.

A first type is a computer instruction that may be split into two actions, and includes the conditional move instruction "CMOV", the instruction "CMPXCHG16B" for comparing and exchanging 16 bytes, the floating-point conditional move instruction "FCMOVcc", the instruction "FCOMI" for comparing floating-point values and setting load flags, the instruction "FCOMIP" for comparing floating-point values, setting load flags, and popping, the instruction "FUCOMI" for inversely comparing floating-point values and setting load flags, and the instruction "FUCOMIP" for inversely comparing floating-point values, setting load flags, and popping. If a process exception occurs because the MIC executes a binary code including a computer instruction of the first type, and the MIC needs to continue to execute the process, the MIC translates the binary code including the computer instruction of the first type into an intermediate code, where the intermediate code is a binary code including two actions, and in the instruction set of the MIC, there are corresponding computer instructions for the two actions respectively. Then, the intermediate code is translated into a binary code supported by the MIC, where an operation code of each binary code in the binary codes supported by the MIC represents a corresponding computer instruction in the instruction set of the MIC. In this way, the MIC can identify and execute the translated binary code. Using the conditional move instruction "CMOV" as an example, the MIC cannot identify a binary code that uses a binary code representing the conditional move instruction as an operand, and therefore, the exception handling module translates, by using an intermediate code, the binary code into a binary code supported by the MIC, which includes the following translation of the instruction in a binary code form: a condition decision instruction and a move instruction represented by an intermediate code are determined according to the conditional move instruction, and then the condition decision instruction and the move instruction represented by the intermediate code are translated into a condition decision instruction and a move instruction (MOV) that can be identified by the MIC; the MIC first executes the condition decision instruction to determine whether a move condition is met, and if the move condition is met, executes the move instruction (MOV).

A second type is a computer instruction for reading data or writing data by using a port, and includes the instruction "IN" for inputting from a port, the instruction "INS" for inputting a string from a port, the instruction "INSB" for inputting a byte string from a port, the instruction "INSD" for inputting a doubleword string from a port, the instruction "INSW" for inputting a word string from a port, the monitoring instruction "MONITOR", the thread synchronization instruction "MWAIT", the instruction "OUT" for outputting to a port, the instruction "OUTS" for outputting a string to a port, the instruction "OUTSB" for outputting a byte string to a port, the instruction "OUTSD" for outputting a doubleword to a port, and the instruction "OUTSW" for outputting a word string to a port. If a process exception occurs because the MIC executes an instruction of the second type, and the MIC continues to execute the process, there are two cases for handling. The first case is that data is written by using a port, and in this case, the MIC notifies the X86 processor to write data from a target port specified by the computer instruction; the second case is a computer instruction for reading data, and in this case, the MIC first notifies the X86 processor to read data from a target port specified by the computer instruction to the memory, and then accesses the memory to acquire the data.

A third type includes the pause instruction "PAUSE", the system entry instruction "SYSENTER", and the system exit instruction "SYSEXIT". The three instructions are added later. To enhance performance, the pause instruction "PAUSE" is to reduce a performance loss of a spin lock, and the system entry instruction "SYSENTER" and the system exit instruction "SYSEXIT" are to reduce a loss in switching between a kernel mode and a user mode. The third type of computer instruction is optimization of the original X86 instruction set, but the MIC does not support the optimization. If a process exception is triggered when the MIC executes the pause instruction "PAUSE" represented by a binary code, and the MIC continues to execute the process, the MIC may continue to run the process by executing the spin lock represented by a binary code instead of executing the pause instruction "PAUSE" represented by the binary code. If a process exception is triggered during execution of the system entry instruction "SYSENTER" represented by a binary code, the MIC may continue to run the process by executing a switch instruction used for switching from the user mode to the kernel mode and represented by a binary code, instead of executing the system entry instruction "SYSENTER" represented by the binary code. If a process exception is triggered during execution of the system exit instruction "SYSEXIT" represented by a binary code, the MIC may continue to run the process by executing a switch instruction used for switching from the kernel mode to the user mode and represented by a binary code, instead of executing the system exit instruction "SYSEXIT" represented by the binary code.

In this embodiment, if the MIC smoothly completes execution of the process migrated by the X86 processor, the MIC may feed back an execution result to the X86 processor, or may control to directly output an execution result, where an output manner includes but is not limited to: presenting the execution result by using a data output module such as a display module or executing other actions based on the execution result.

In this embodiment, after running the uos operating system, the MIC may perform process scheduling. Then, when load is heavy (usage of the X86 processor is greater than the first threshold, and/or usage of the memory of the X86 processor is greater than the second threshold), the X86 processor migrates a process that is screened out to the MIC for execution, so that the load of the X86 processor is shared. In particular, for a process with heavy load, the X86 processor may migrate the process to the MIC for execution, which prolongs a useful life of the X86 processor, and further ensures that sufficient resources can be allocated to each process, and ensures execution efficiency of each process.

Figure 4:
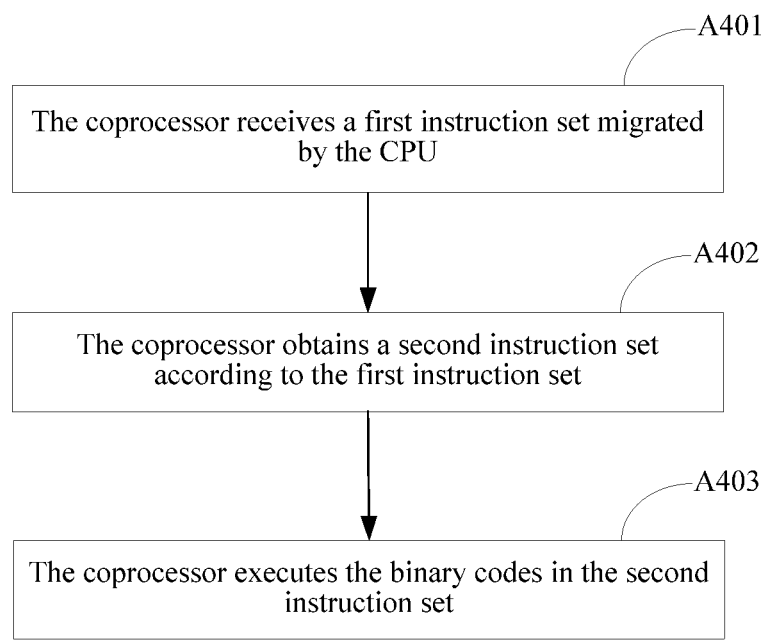
FIG. 4 is an exemplary flowchart of a computer instruction processing method.

In an embodiment of the present application, based on the foregoing system 200 and an improvement made on how the coprocessor runs the process migrated from the CPU in the foregoing embodiment, this embodiment makes adaptive extensions on the technical solution of the foregoing embodiment, and provides, from a perspective of a coprocessor 202, a basic process implemented by using a computer instruction processing method. FIG. 4 is an exemplary work process of the computer instruction processing method, but for ease of description, only parts related to this embodiment of the present application are shown.

The computer instruction processing method provided by this embodiment is applied to a processor system. The processor system includes a coprocessor and a central processing unit CPU. A first operating system runs on the CPU, and a second operating system runs on the coprocessor. The first operating system is an operating system supporting an instruction set of the CPU, and the second operating system is an operating system supporting an instruction set of the coprocessor.

After running the second operating system, the coprocessor may use the second operating system to run processes and threads, perform scheduling between processes, and perform scheduling between threads; further, the CPU may migrate one or more processes to the coprocessor. In this embodiment, a first process is defined as a single process migrated from the CPU to the coprocessor. In addition, the CPU may further migrate one or more threads to the coprocessor. In this embodiment, a first thread is defined as a single thread migrated from the CPU to the coprocessor.

Still further, not only processes and threads may be migrated between the CPU and the coprocessor, but also one or more binary codes may be migrated. A first instruction set is defined in this embodiment. If the CPU migrates a process to the coprocessor, the first instruction set refers to binary codes required for executing the process; if the CPU migrates a thread to the coprocessor, the first instruction set refers to binary codes required for executing the thread; if the CPU migrates one or more binary codes to the coprocessor, the first instruction set refers to a set of binary codes migrated by the CPU to the coprocessor.

The binary codes included in the first instruction set are obtained by compiling source code according to the instruction set of the CPU. Whether the compilation is executed by the first operating system is not limited. The compilation may be executed by the first operating system, or the first operating system obtains the first instruction set after another compiler completes the compilation. In addition, the source code is not limited herein, and a programming language used to compile the source code is not limited.

As shown in FIG. 4, the computer instruction processing method provided by this embodiment includes step A401, step A402, and step A403.

Step A401: The coprocessor receives a first instruction set migrated by the CPU, where the first instruction set is used to instruct the CPU to execute computer operations in the first operating system, and the first instruction set is a set of binary codes that are applicable to the first operating system.

In this embodiment, a condition for triggering the CPU to migrate the first instruction set to the coprocessor is not limited. The CPU may even migrate the first instruction set to the coprocessor under any condition.

For example, once the CPU receives an instruction set migration instruction during execution of the first instruction set, the CPU migrates the first instruction set to the coprocessor, where the instruction set migration instruction is triggered by any one of the following three conditions:

A first condition is manually triggering the instruction set migration instruction. For example, both the CPU and the coprocessor are integrated in a data processing device, and a manual operation on the data processing device triggers the instruction set migration instruction.

A second condition is: the CPU determines, according to CPU usage, whether to migrate the first instruction set to the coprocessor, and if CPU usage of the CPU is greater than a first threshold, triggers the instruction set migration instruction.

A third condition is: the CPU determines, according to memory usage of a memory used by the CPU, whether to migrate the first instruction set to the coprocessor, and if memory usage of the memory in the CPU is greater than a second threshold, triggers the instruction set migration instruction.

It should be noted that, because the first instruction set is obtained by compiling the source code according to the binary codes representing the instruction set of the CPU, and an operation code of each binary code in the first instruction set obtained through compilation belongs to a binary code representing the instruction set of the CPU, each binary code representing a computer instruction in the first instruction set can be identified and executed by the CPU. Generally, a binary code representing a computer instruction triggers a computer operation. For example, when a process running on an X86 processor runs to a binary code "1101100011100000", a computer operation of a subtraction operation on a floating-point number is performed; for another example, when a process running on the X86 processor executes a binary code "1101100011100000", a computer operation of restoring a stored status of an FPU register to the FPU register is performed.

It should be noted that, each binary code in the first instruction set not only includes an operation code, but also may include an operand. The operation code is represented by a binary code, and the operand is also represented by a binary code.

In this embodiment, the CPU migrates the first instruction set to the coprocessor, and the coprocessor executes step A401 to receive the first instruction set migrated by the CPU. For example, the CPU sends the first instruction set to the coprocessor during migration of a first process to the coprocessor, and the coprocessor executes step A401 to receive the first instruction set migrated by the CPU.

Step A402: The coprocessor obtains a second instruction set according to the first instruction set, where binary codes in the second instruction set are used to instruct the coprocessor to execute the computer operations in the second operating system.

Specifically, as mentioned above, the instruction set of the CPU is divided into a first part of instruction subsets, a second part of instruction subsets, and a third part of instruction subsets. The instruction set of the coprocessor does not include the third part of instruction subsets. Therefore, the instruction set of the coprocessor is different from the instruction set of the CPU. In addition, for a computer instruction included in the second part of instruction subsets, a binary code supported by the central processing unit 201 and representing the computer instruction is different from a binary code supported by the coprocessor 202 and representing the computer instruction. Therefore, neither the binary code representing the computer instruction included in the second part of instruction subsets nor the binary code representing the computer instruction included in the third part of instruction subsets can be identified and executed by the coprocessor. In view of this, this embodiment provides step A402 in which the second instruction set is obtained by translating a part of binary codes or all binary codes in the first instruction set. Relative to the first instruction set, the second instruction set includes more binary codes that can be identified and executed by the coprocessor, and the second instruction set has higher identifiability and executability. Similar to the first instruction set, each binary code included in the second instruction set triggers a computer operation. A binary code included in the second instruction set triggers a computer operation. In addition, in this embodiment, the computer operations expected to be triggered by the second instruction set and executed by the coprocessor are the same as the computer operations triggered by the first instruction set and executed by the CPU.

Optionally, if the first instruction set includes a binary code representing a computer instruction (a computer instruction in the first part of instruction subsets), in step A402, when the second instruction set is acquired according to the first instruction set, the binary code included in the first instruction set is directly acquired and added to the second instruction set.

Optionally, if the first instruction set includes a binary code representing a computer instruction (a computer instruction in the second part of instruction subsets), in step A402, when the second instruction set is acquired according to the first instruction set, the binary code included in the first instruction set is translated into a binary code supported by the coprocessor and representing the computer instruction, and the translated binary code is acquired and added to the second instruction set.

Optionally, if the first instruction set includes a binary code representing a computer instruction (a computer instruction in the third part of instruction subsets), in step A402, when the second instruction set is acquired according to the first instruction set, the binary code included in the first instruction set is directly acquired and added to the second instruction set.

It should be noted that, if the CPU migrates the first process to the coprocessor, the coprocessor not only receives the first instruction set required for executing the first process, but also acquires other data related to the first process from the CPU, including a process status of the first process and a register value related to the first process; the process status includes status information necessary for running of the process, such as a process priority, a process identifier, and a stack pointer; the coprocessor stores the register value related to the first processor to a register of the coprocessor. In addition, if the register of the coprocessor and a register of the CPU do not belong to a same type of register, in step A402, when the second instruction set is acquired according to the first instruction set, a register address of the CPU in the binary codes in the first instruction set needs to be further replaced with a register address of the coprocessor, and the replaced register address of the coprocessor is acquired and added to the second instruction set. Optionally, if the register of the coprocessor and the register of the CPU belong to the same type of register, in step A402, when the second instruction set is acquired according to the first instruction set, the register address of the CPU in the binary codes in the first instruction set is directly acquired and added to the second instruction set.

It should be noted that, if the CPU migrates a first thread to the coprocessor, the coprocessor not only receives the first instruction set required for executing the first thread, but also acquires other data related to the first thread from the CPU, including a thread status of the first thread and a register value related to the first thread. The coprocessor stores the register value related to the first thread to the register of the coprocessor. Similar to the case in which the CPU migrates the first instruction set required for executing the first thread to the coprocessor, herein it is also determined, according to whether the register of the coprocessor and the register of the CPU belong to the same type of register, whether the register address of the CPU or the register address of the coprocessor is acquired and added to the second instruction set when the second instruction set is acquired according to the first instruction set in step A402.

It should be noted that, if the first instruction set migrated by the CPU to the coprocessor is a set of binary codes, the coprocessor further acquires, from the CPU, other data required for executing the first instruction set, including a register value related to the first instruction set. The coprocessor stores the register value related to the first instruction set to the register of the coprocessor. Similar to the case in which the CPU migrates the first instruction set required for executing the first thread to the coprocessor, herein it is also determined, according to whether the register of the coprocessor and the register of the CPU belong to the same type of register, whether the register address of the CPU or the register address of the coprocessor is acquired and added to the second instruction set when the second instruction set is acquired according to the first instruction set in step A402.

Step A403: The coprocessor executes the binary codes in the second instruction set.

If the CPU migrates the first instruction set required for executing the first process to the coprocessor, the second operating system determines, on the coprocessor, a process running node of a second process according to the process status of the first process and the register value. Starting from the process running node, the register of the coprocessor is used, and the binary codes in the second instruction set are executed to run the second process.

If the CPU migrates the first instruction set required for executing the first thread to the coprocessor, the second operating system determines, on the coprocessor, a thread running node of a second thread according to the thread status of the first thread and the register value. Starting from the thread running node, the register of the coprocessor is used, and the binary codes in the second instruction set are executed to run the second thread.

If the first instruction set migrated by the CPU to the coprocessor is a set of binary codes, the coprocessor uses the register of the coprocessor, and executes the second instruction set.

In this embodiment, for the first instruction set migrated by the CPU, even if the first instruction set obtained through compilation according to the instruction set of the CPU includes binary codes that cannot be identified by the coprocessor, the coprocessor executes step A402, and a part or all of the binary codes can be translated, and correspondingly, the second instruction set is generated. An identification rate of the second instruction set that can be identified by the coprocessor is greater than an identification rate of the first instruction set that can be identified. The coprocessor executes the second instruction set, which reduces load required for running the first instruction set.

Optionally, if the coprocessor completes execution of the second instruction set in step A403, the coprocessor determines, according to a specific application scenario, whether to feed back an execution result of the second instruction set to the CPU; if the CPU executes other computer operations according to the result, the coprocessor feeds back the result to the CPU; if the coprocessor executes other computer operations according to the result, the coprocessor may not feed back the result to the CPU. For example, for the execution result of the second instruction set, if a next computer operation is that the CPU controls a display module to display the execution result, the coprocessor feeds back the execution result to the CPU; if the coprocessor can directly control the display module, and a next computer operation is that the coprocessor controls the display module to display the execution result, the coprocessor may not need to feed back the execution result to the CPU, but directly controls the display module to display the execution result.

Figure 5:
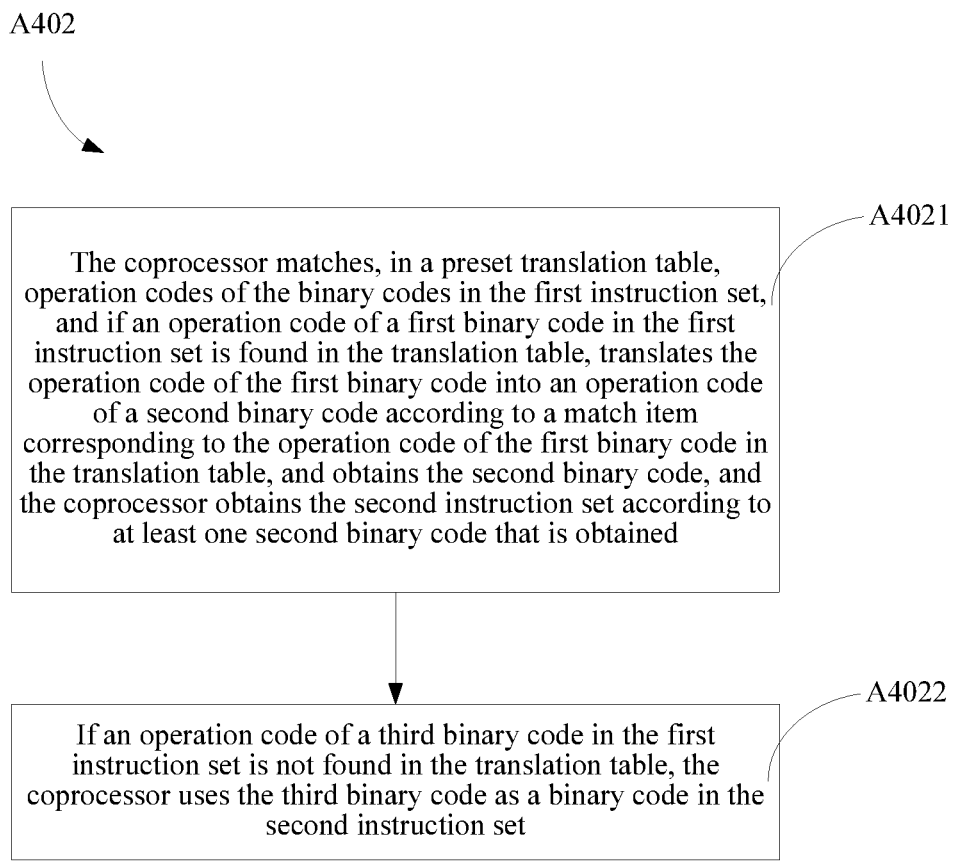
FIG. 5 is an optional exemplary flowchart of step A402.

Optionally, for a scenario in which the first instruction set includes a binary code representing a computer instruction in the second part of instruction subsets, step A402 is further refined. Referring to FIG. 5, that the coprocessor obtains a second instruction set according to the first instruction set includes:

Step A4021: The coprocessor matches, in a preset translation table, operation codes of the binary codes in the first instruction set, and if an operation code of a first binary code in the first instruction set is found in the translation table, translates the operation code of the first binary code into an operation code of a second binary code according to a match item corresponding to the operation code of the first binary code in the translation table, and obtains the second binary code, and the coprocessor obtains the second instruction set according to at least one second binary code that is obtained, where the translation table includes a correspondence between different operation codes that are respectively generated for the first operating system and the second operating system by compiling a same computer instruction, and the second binary code is a binary code that is applicable to the second operating system.

Specifically, for each computer instruction included in the second part of instruction subsets, the instruction set supported by the coprocessor also includes the same computer instruction. However, a binary code supported by the CPU and representing the computer instruction is different from a binary code supported by the coprocessor and representing the computer instruction. In order for the coprocessor to identify the computer instruction, a translation table is created. The translation table records a correspondence of each computer instruction for each computer instruction in the second part of instruction subsets. The correspondence of the computer instruction includes a binary code supported by the CPU and representing the computer instruction, and a binary code supported by the coprocessor and representing the computer instruction.

In this embodiment, a specific computer instruction is defined as a computer instruction with the correspondence recorded in the translation table. Therefore, in this embodiment, the correspondence of each computer instruction included in the second part of instruction subsets is added to the translation table, and each computer instruction included in the second part of instruction subsets is a specific computer instruction.

After the second operating system of the coprocessor loads the translation table, for the first instruction set migrated from the CPU to the coprocessor in step A401, each binary code in the first instruction set is traversed according to the translation table in step A4021 to match and find whether a first binary code exists. An operation code of the first binary code is a binary code supported by the CPU and recorded in the translation table (namely, a binary code supported by the CPU and representing a computer instruction in the second part of instruction subsets).

When the coprocessor obtains the second instruction set according to the first instruction set, in step A4021, for each first binary code in the first instruction set, an operation code in the first binary code is replaced with a match item corresponding to the operation code recorded in the translation table, where the match item is a binary code supported by the coprocessor and representing a specific computer instruction (a specific computer instruction represented by the operation code in the first binary code). A binary code obtained by replacing the operation code is used as a second binary code. In the second binary code, the match item is an operation code of the second binary code. The second binary code is acquired and added to the second instruction set. Therefore, it can be known that, when the coprocessor obtains the second instruction set according to the first instruction set, each first binary code in the first instruction set is translated into a corresponding second binary code, and the second binary code is acquired and added to the second instruction set.

For example, for an exclusive OR instruction (XOR), a binary code supported by the CPU and representing the exclusive OR instruction varies with a compared object. If two register values are compared, a binary code of the exclusive OR instruction is represented by "0011001". If a register value and a value in the memory are compared, a binary code of the exclusive OR instruction is represented by "0011000". However, in the coprocessor, binary codes of the exclusive OR instruction (XOR) are all represented by "0011000". A mapping relationship between "0011001" and "0011000" is recorded in the translation table. The coprocessor finds, according to the translation table, "0011001" from the operation code of the first binary code of the first instruction set, and uses "0011000" as the operation code of the second binary code. If the second binary code has an operand, how to generate an operand of the second binary code according to the operand of the first binary code is not limited herein.

In addition, when the coprocessor obtains the second instruction set according to the first instruction set, the coprocessor finds, according to the translation table, other binary codes that do not belong to the first binary codes. Which manner is used to acquire binary codes corresponding to other binary codes and add the binary codes to the second instruction set is not limited.

Further, optionally, for a scenario in which a binary code of a computer instruction in the first part of instruction subsets and/or the third part of instruction subsets included in the first instruction set is processed in step A402, step A402 is further refined. Referring to FIG. 5, that the coprocessor obtains a second instruction set according to the first instruction set further includes:

Step A4022: If an operation code of a third binary code in the first instruction set is not found in the translation table, the coprocessor uses the third binary code as a binary code in the second instruction set.

Specifically, the third binary code belongs to another binary code that is not the first binary code and is found in the first instruction set during traversal search according to the translation table in step A4021.

If an operation code of a certain binary code in the first instruction set is a binary code representing a computer instruction in the first part of instruction subsets, the operation code of the binary code is not found in the translation table; if an operation code of a certain binary code in the first instruction set is a binary code representing a computer instruction in the third part of instruction subsets, the operation code of the binary code is not found in the translation table. Therefore, the operation code of the third binary code may be a binary code representing a computer instruction in the first part of instruction subsets, or may be a binary code of a computer instruction in the third part of instruction subsets.

When the coprocessor obtains the second instruction set according to the first instruction set, for the binary code (namely, the third binary code) whose operation code in the first instruction set cannot be found in the translation table, the third binary code is directly acquired from the first instruction set and added to the second instruction set in step A4022.

Optionally, step A402 may include step A4021 and/or step A4022. Whether step A4021 or step A4022 is executed during execution of step A402 is determined according to a specific implementation scenario. In an implementation scenario, if no specific computer instruction exists in the first instruction set, and the CPU and the coprocessor use a same type of register to execute the process, step A402 includes step A4022; if the first instruction set includes a specific computer instruction, step A4021 is included during execution of step A402. FIG. 5 shows a schematic diagram in which step A4021 and/or step A4022 needs to be executed in step A402.

Further, optionally, if step A4021 and step A4022 need to be executed in step A402, step A4021 may be first executed and then A4022 is executed, or step A4021 and step A4022 are executed concurrently.

In a specific example of concurrent execution of step A4021 and step A4022, when a first binary code is found by traversing the first instruction set according to the translation table, every time whether a binary code in the first instruction set is a first binary code is determined, execution of step A4021 or step A4022 is determined according to a determining result. Specifically, if the determining result is that the binary code is a first binary code, step A4021 is executed, so that a second binary code corresponding to the first binary code is acquired and added to the second instruction set. If the determining result is that the binary code is a third binary code, step A4022 is executed, so that the third binary code is directly acquired and added to the second instruction set.

Optionally, a sequence of searching for the first binary code by traversing the first instruction set according to the translation table is an execution sequence of each binary code in the first instruction set.

In an optional extension, there may be one or more correspondences (a binary code supported by the CPU and representing a computer instruction, and a binary code supported by the coprocessor and representing the computer instruction) recorded in the translation table. The foregoing translation table used in step A4021 records the correspondence that matches each computer instruction in the second part of instruction subsets, but a quantity of correspondences in the translation table herein may be less than that recorded in the translation table used in step A4021. Therefore, the translation table herein may be updated, for example, the correspondence that matches a certain computer instruction in the second part of instruction subsets is added to the translation table, or one or more of the correspondences are deleted from the translation table. Therefore, an alternative step A4021 is provided, that is, when step A4021 is executed, the translation table herein is used to replace the translation table used above.

Figure 6:
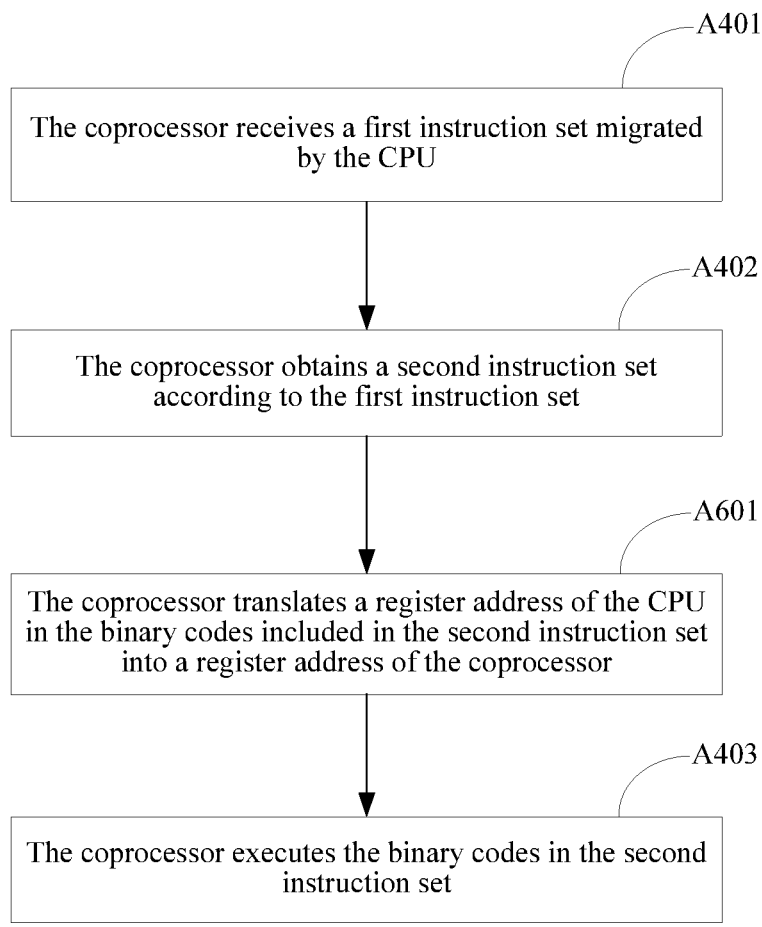
FIG. 6 is another exemplary flowchart of a computer instruction processing method.

Optionally, for a scenario in which the register of the CPU and the register of the coprocessor are not the same type of register, the computer instruction processing method is optionally refined. Referring to FIG. 6, before the coprocessor executes the binary codes in the second instruction set, the method further includes step A601.

Step A601: The coprocessor translates a register address of the CPU in the binary codes included in the second instruction set into a register address of the coprocessor.

Specifically, the register address of the CPU is represented by a binary code, and the register address of the coprocessor is represented by a binary code. The register of the CPU and the register of the coprocessor are not the same type of register, and the binary code representing the register address of the CPU is different from the binary code representing the register address of the coprocessor.

In order that the coprocessor uses its own register to run the second instruction set, the coprocessor finds, before executing the second instruction set, whether the binary codes in the second instruction set include the register address of the CPU; if the register address is found, replaces, according to a match and replacement relationship, the register address of the CPU that is found in the second instruction set with the corresponding register address of the coprocessor, where the match and replacement relationship is a mapping relationship between the register address of the coprocessor and the register address of the CPU.

Optionally, in an alternative solution for step A601, when the coprocessor obtains the second instruction set according to the first instruction set in step A402, step A602 is executed, where the register address of the CPU in the binary codes included in the first instruction set is translated into the register address of the coprocessor, and the register address of the coprocessor is acquired and added to the second instruction set. In this case, an execution sequence of the alternative solution of step A602 and step A4021 is not limited. Generally, the alternative solution and step A4021 are executed concurrently.

Optionally, the register of the CPU is a 128-bit register or a 256-bit register, and the register of the coprocessor is a 512-bit register.

Still further, optionally, the register of the CPU is a 128-bit XMM register or a 256-bit YMM register, and the register of the coprocessor is a 256-bit ZMM register. Regardless of the register of the CPU or the register of the coprocessor, when the second instruction set is executed, the register is used to store a computer instruction, data, and an address. In comparison with execution of the second instruction set based on the XMM register or based on the YMM register, when the second instruction set is executed based on the ZMM register, an execution speed of the second instruction set can be increased, and execution of the second instruction set can be completed in advance.

Further, optionally, a computer instruction that uses the register of the CPU in the first instruction set belongs to a vector instruction, and a computer instruction that uses the register of the coprocessor in the second instruction set belongs to a vector instruction. When the second instruction set is obtained according to the first instruction set in step A402, the vector instruction that uses the register of the coprocessor is correspondingly acquired according to the vector instruction that uses the register of the CPU in the first instruction set, and is added to the second instruction set.

Optionally, the first instruction set is migrated to the coprocessor by the CPU when CPU usage of the CPU is greater than the first threshold.

Specifically, the CPU executes the first instruction set, and optionally may further concurrently execute one or more other binary codes. If the CPU usage is greater than the first threshold, which represents that the CPU usage is excessively high, the first instruction set is migrated to the coprocessor to reduce CPU load.

The following uses the first process as an example to describe how to screen out the first instruction set migrated to the coprocessor. Certainly, a manner of screening out the first process is also applicable to screening out the first thread; the manner of screening out the first process is described as follows: if the CPU runs only one process, the process is the first process. If the CPU runs a plurality of processes concurrently, several optional refined implementation manners are provided for determining the first process from the plurality of processes executed by the CPU:

In a first optional refined implementation manner, when CPU usage of the CPU is greater than the first threshold currently, one or more first processes are selected from processes whose priorities are lower than a priority threshold, and preferably, a process with a lowest priority is selected as the first process.

In a second optional refined implementation manner, when CPU usage of the CPU is greater than the first threshold currently, one or more first processes are selected from processes whose CPU usage is greater than a usage threshold, and preferably, a process with highest CPU usage is selected as the first process.

Figure 7:
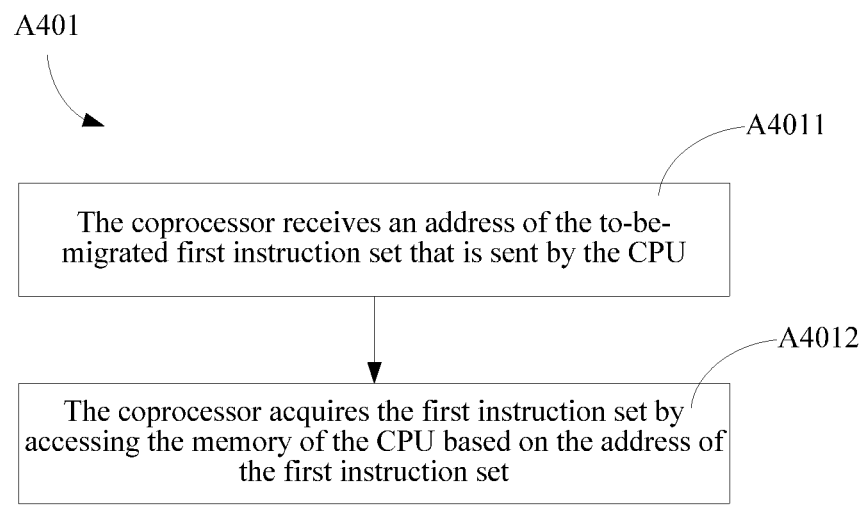
FIG. 7 is an optional exemplary flowchart of step A401.

Further, optionally, referring to FIG. 7, that the coprocessor receives a first instruction set migrated by the CPU in step A401 includes step A4011 and step A4012.

Step A4011: The coprocessor receives an address of the to-be-migrated first instruction set that is sent by the CPU, where the address of the first instruction set is a storage address of the first instruction set in a memory of the CPU, and the address of the first instruction set is sent to the coprocessor by the CPU when memory usage of the CPU is less than or equal to a second threshold.

Step A4012: The coprocessor acquires the first instruction set by accessing the memory of the CPU based on the address of the first instruction set.

Specifically, that CPU usage of the CPU is greater than the first threshold but memory usage of the memory used by the CPU is less than or equal to the second threshold represents that CPU usage is excessively high but memory usage of the memory used by the CPU is not excessively high. In this case, the CPU sends the address of the first instruction set to the coprocessor. Optionally, the address of the first instruction set is a physical address of the first instruction set stored in the memory of the CPU. After the coprocessor receives the address of the first instruction set in step A4011, the coprocessor executes step A4012 to access the memory of the CPU according to the address of the first instruction set and read the first instruction set from the memory of the CPU, then executes step A402 to acquire the second instruction set according to the first instruction set, and stores the acquired second instruction set to the memory of the CPU. An optional specific manner is replacing the first instruction set in the memory of the CPU with the acquired second instruction set.

A specific optional implementation manner of step A4011 and step A4012 is: when CPU usage is greater than the first threshold and memory usage of the memory used by the CPU is less than or equal to the second threshold, the CPU sends a storage address of data related to the first instruction set in the memory of the CPU to the coprocessor; afterward, the coprocessor accesses the memory of the CPU according to the storage address by using a bus (such as a PCI-E bus), reads the data related to the first instruction set from the memory of the CPU, extracts the first instruction set from the data related to the first instruction set, then executes step A402 to acquire the second instruction set according to the first instruction set, stores the acquired second instruction set to the memory of the CPU, and uses the memory of the CPU to execute the second instruction set.

The data related to the first instruction set includes the first instruction set, and further includes other data required for executing the first instruction set, such as a running status (the process status of the first process) of the first instruction set.

Optionally, the first instruction set is sent to the coprocessor by the CPU when memory usage of the CPU is greater than the second threshold.

Specifically, if memory usage of the memory used by the CPU is greater than the second threshold, it represents that memory usage of the memory used by the CPU is excessively high. In this case, regardless of whether CPU usage of the CPU is greater than the first threshold, the CPU migrates the first instruction set to the coprocessor, and in step A401, the first instruction set is received and stored to the memory of the coprocessor.

A specific optional implementation manner is: when memory usage of the memory used by the CPU is greater than the second threshold, the CPU reads the data related to the first instruction set from the memory used by the CPU, and sends the data related to the first instruction set to the coprocessor; the coprocessor receives the data related to the first instruction set, and stores the data related to the first instruction set to the memory of the coprocessor; then the coprocessor extracts the first instruction set from the data related to the first instruction set, executes step A402 to acquire the second instruction set according to the first instruction set, stores the acquired second instruction set to the memory of the coprocessor, and uses the memory of the coprocessor to execute the second instruction set.

Optionally, if an exception occurs during execution of the second instruction set in step A403, any optional manner in the following four optional manners may be used for handling.

Figure 8:
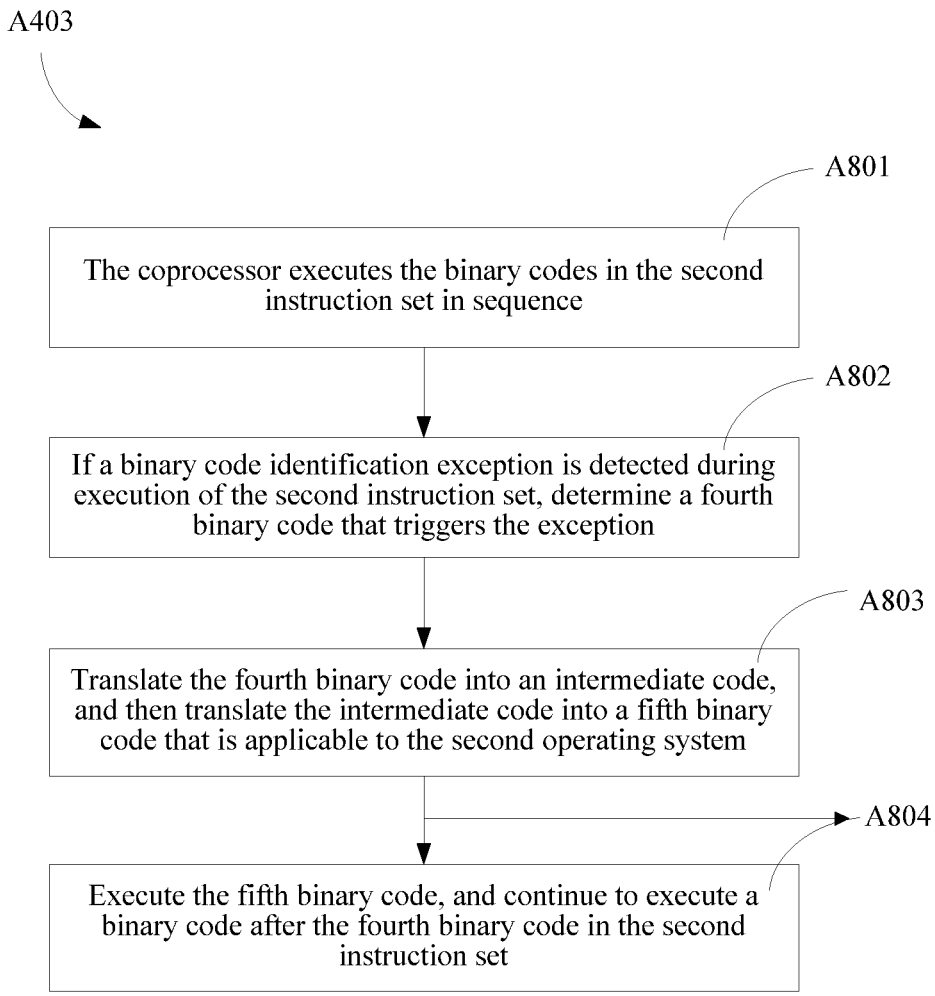
FIG. 8 is an optional exemplary flowchart for handling a binary code exception in step A403.

In a first optional manner, referring to FIG. 8, that the coprocessor executes the binary codes in the second instruction set in step A403 specifically includes step A801, step A802, step A803, and step A804.

Step A801: The coprocessor executes the binary codes in the second instruction set in sequence.

Step A802: If a binary code identification exception is detected during execution of the second instruction set, determine a fourth binary code that triggers the exception.

Step A803: Translate the fourth binary code into an intermediate code, and then translate the intermediate code into a fifth binary code that is applicable to the second operating system, where the fifth binary code is one or more binary codes.

Step A804: Execute the fifth binary code, and continue to execute a binary code after the fourth binary code in the second instruction set.

Specifically, the second instruction set is acquired according to the first instruction set in step A402. Although the binary codes in the second instruction set are used to instruct the coprocessor to execute the computer operations in the second operating system, not every binary code in the second instruction set can be identified by the coprocessor, and a binary code identification exception may be triggered when the coprocessor executes a binary code that cannot be identified. In this embodiment, a binary instruction triggering a binary code exception is defined as the fourth binary code.

A scenario in which a binary code in the second instruction set cannot be identified is: if a binary code representing each computer instruction in the third part of instruction subsets in the first instruction set is directly acquired and added to the second instruction set in step A402, when the coprocessor runs the second instruction set, a binary code identification exception is triggered because the coprocessor cannot identify the binary code during execution of a binary code that uses the binary code as an operation code. Therefore, the binary code belongs to the fourth binary code.

When the coprocessor executes the binary codes in the second instruction set in sequence in step A801, if a binary code identification exception is detected in step A802, a fourth binary code that triggers the binary code identification exception is determined; then the fourth binary code is translated into an intermediate code in step A803, and then the intermediate code is translated into a fifth binary code that can be identified by the coprocessor; then the fifth binary code is executed, and execution of a binary code after the fourth binary code in the second instruction set is continued in step A804. The intermediate code has a mapping relationship with the fourth binary code, where the mapping relationship may be a correspondence between one or more intermediate codes and one fourth binary code. In addition, the intermediate code further has a mapping relationship with the fifth binary code. A specific representation form of the intermediate code is not limited when a condition that the intermediate code has mapping relationships with both the fourth binary code and the fifth binary code is met. For example, a Java bytecode is used as an intermediate code, and when the fourth binary code is translated into a corresponding Java bytecode, a mapping relationship between the fourth binary code and the corresponding Java bytecode is determined; when the corresponding Java bytecode is translated into the fifth binary code, a mapping relationship between the corresponding Java bytecode and the fifth binary code is determined. Similarly, during translation of the fourth binary code into the fifth binary code in step A803, an intermediate code in a simics simulator may be further selected for implementation, or an intermediate code in a qemu simulator may be further selected for implementation.

For example, the MIC does not support 22 computer instructions such as CMOV, OUT, PAUSE, and SYSEXIT included in the foregoing third part of instruction subsets. When the MIC executes the fourth binary code that uses the binary code representing the computer instruction as an operation code, the MIC cannot identify the fourth binary code, and a binary code identification exception occurs. Using a conditional move instruction (CMOV) as an example, a binary code identification exception is triggered when the MIC executes the fourth binary code that uses a binary code representing the conditional move instruction as an operation code. The binary code identification exception is detected in step A802, and a condition decision instruction and a move instruction represented by an intermediate code are determined according to the conditional move instruction in step A803; then the condition decision instruction and the move instruction represented by the intermediate code are respectively translated into a condition decision instruction and a move instruction (MOV) that can be identified by the MIC. The MIC first executes the condition decision instruction in step A804 to determine whether the move condition is met, and if the move condition is met, executes the move instruction (MOV), and then executes the binary code after the fourth binary code in the second instruction set. It should be noted that, operands respectively carried in the condition decision instruction and the move instruction represented by the intermediate code are determined according to an operand carried in the conditional move instruction (CMOV), and then operands respectively carried in the condition decision instruction and the move instruction (MOV) that can be identified by the MIC are determined according to the operands respectively carried in the condition decision instruction and the move instruction represented by the intermediate code. According to the foregoing classification of the 22 computer instructions, for the computer instructions included in the first type and the third type, the fourth binary code that uses the binary code representing the computer instruction as an operation code can be translated into the fifth binary code by using an intermediate code in step A803. There may be one or more fifth binary codes translated from one fourth binary code, and the quantity of fifth binary codes is not limited herein.

Optionally, an exception occurs when the second instruction set is executed in step A403, execution of the second instruction set is paused, and exception information is output, where the exception information includes the fourth binary code that triggers the exception, an exception type, an exceptional execution result, and the like. In optional specific implementation, status information of execution of the second instruction set is written into a running log of the second instruction set in real time, where exception information of an exception that occurs during execution of the second instruction set is also written into the running log of the second instruction set. If it is determined, according to the exception information, that the exception is a binary code identification exception, the fourth binary code that triggers the exception is determined according to the exception information in step A802.

In the first optional manner, even if a binary code identification exception occurs when the coprocessor executes the second instruction set, the fourth binary code can be translated indirectly, by using an intermediate code, into the fifth binary code supported by the coprocessor, and execution of the second instruction set is continued, starting from the fifth binary code. Therefore, the exception is effectively overcome, and normal execution of the second instruction set is ensured. By analogy, every exception that occurs during execution of the second instruction set can be effectively overcome, and execution of the second instruction set is continued every time after the exception is overcome.

Optionally, for improving execution efficiency of the coprocessor, an extended instruction set supported only by the coprocessor is generally developed for a special application of the coprocessor, where a computer instruction (represented by a binary code) included in the extended instruction set is supported only by the coprocessor but not supported by the CPU. A mapping relationship between an operation code represented by an intermediate code and one or more computer instructions in the instruction set supported by the coprocessor is predetermined, and a mapping relationship between the operation code represented by the intermediate code and one or more computer instructions included in the extended instruction set may be determined. Therefore, for step A803 of translating the intermediate code into the fifth binary code, the operation code of the fifth binary code may be a binary code representing a computer instruction in the extended instruction set. In this way, after the fourth binary code is indirectly translated into a binary code that uses a binary code representing a computer instruction included in the extended instruction set as an operation code, not only the exception indicated by the exception information can be resolved, but also efficiency of executing the second instruction set by the coprocessor can be improved.

Figure 9:
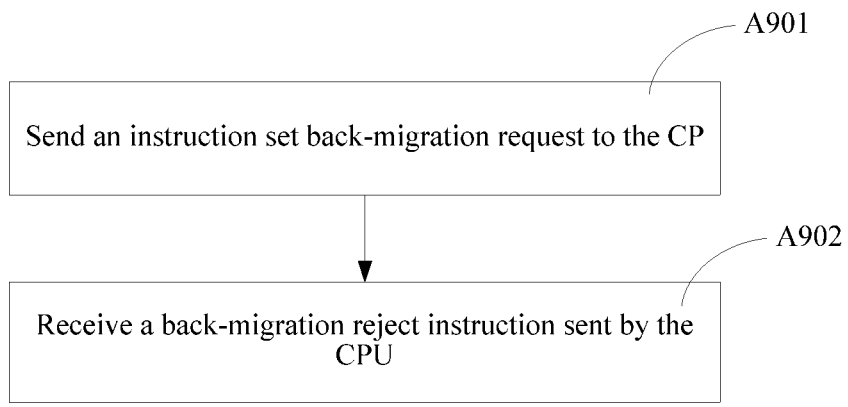
FIG. 9 is an optional exemplary flowchart for handling a binary code exception in step A403.

In a second optional manner, referring to FIG. 9, before the fourth binary code is translated into the intermediate code in step A803, step A901 and step A902 are included.

Step A901: Send an instruction set back-migration request to the CPU.

Step A902: Receive a back-migration reject instruction sent by the CPU.

Specifically, a binary code identification exception occurs when the second instruction set is executed in step A403, and step A901 is executed to send an instruction set back-migration request to the CPU. The CPU responds to the instruction set back-migration request, determines whether to migrate the second instruction set back to the CPU for execution, and if determining not to migrate back the second instruction set, feeds back a back-migration reject instruction to the coprocessor. The coprocessor receives the back-migration reject instruction in step A902, and executes step A803 to translate the fourth binary code into an intermediate code.

An optional manner of responding to the instruction set back-migration request by the CPU is: determining, according to CPU load, whether to migrate the second instruction set back to the CPU for execution, where the CPU load includes CPU usage, and memory usage of the memory used by the CPU. If CPU usage of the CPU is greater than the third threshold, or if memory usage of the memory used by the CPU is greater than a fourth threshold, the back-migration reject instruction is sent to the coprocessor.

Figure 10:
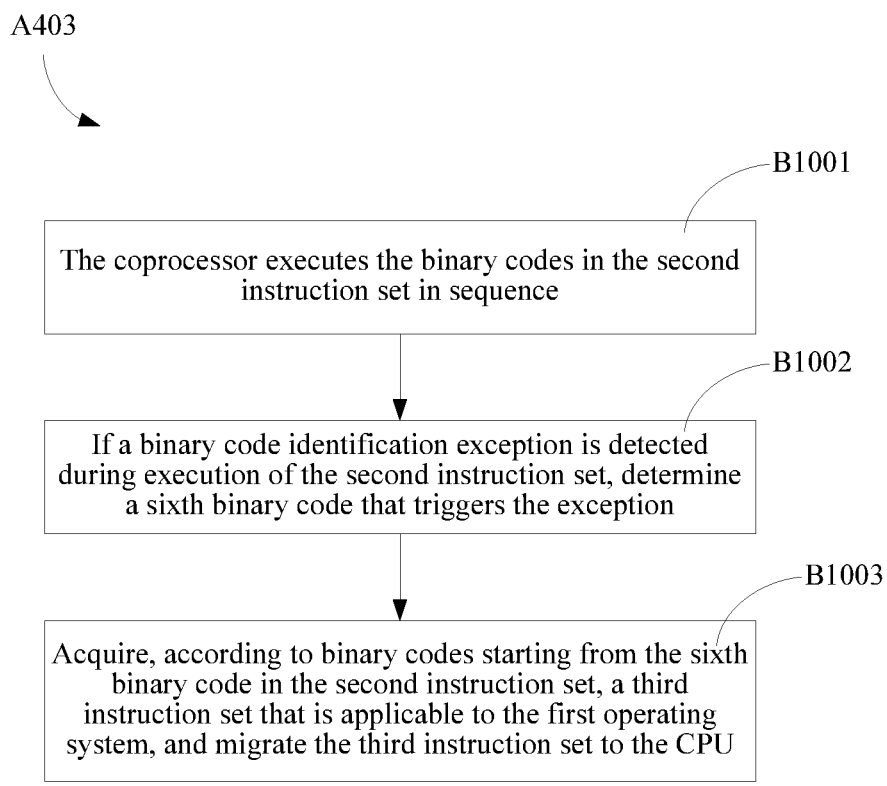
FIG. 10 is an optional exemplary flowchart for handling a binary code exception in step A403.

In a third optional manner, referring to FIG. 10, that the coprocessor executes the binary codes in the second instruction set in step A403 includes step B1001, step B1002, and step B1003.

Step B1001: The coprocessor executes the binary codes in the second instruction set in sequence.

Step B1002: If a binary code identification exception is detected during execution of the second instruction set, determine a sixth binary code that triggers the exception.

Step B1003: Acquire, according to binary codes starting from the sixth binary code in the second instruction set, a third instruction set that is applicable to the first operating system, and migrate the third instruction set to the CPU.

Specifically, the second instruction set is acquired according to the first instruction set in step A402, where not every binary code in the second instruction set can be identified by the coprocessor. A binary code identification exception is triggered when the coprocessor executes a binary code that cannot be identified. In this embodiment, a binary instruction that triggers the binary code exception is defined as the sixth binary code. The definition of the sixth binary code and the definition of the fourth binary code are based on a same principle. Refer to the related explanation about the fourth binary code in the first optional manner. Likewise, if a binary code representing each computer instruction in the third part of instruction subsets in the first instruction set is directly acquired and added to the second instruction set in step A402, when the coprocessor runs the second instruction set, a binary code identification exception is triggered because the coprocessor cannot identify the binary code during execution of a binary code that uses the binary code as an operation code. Therefore, the binary code belongs to the sixth binary code.

Different from the first optional manner, during execution of the binary codes in the second instruction set in sequence in step B1001 by the coprocessor, after the sixth binary code that triggers the exception is determined if the binary code identification exception is detected in step B1002, step B1003 is executed to handle the binary code identification exception.

That the coprocessor acquires, according to binary codes starting from the sixth binary code in the second instruction set, a third instruction set that is applicable to the first operating system in step B1003 is based on a same implementation principle as step A402 of obtaining the second instruction set according to the first instruction set. Refer to the related explanation about step A402 and the related explanation about the optional refinement of step A402, for example, the related explanations about step A4021 and step A4022. Corresponding to step A4021, when the third instruction set that is applicable to the first operating system is acquired according to the binary codes starting from the sixth binary code in the second instruction set in step B1003, each binary code starting from the sixth binary code in the second instruction set is traversed according to the translation table, to match and find whether a seventh binary code exists, where an operation code of the seventh binary code is a binary code supported by the coprocessor and recorded in the translation table. The operation code in the seventh binary code is replaced with a match item corresponding to the operation code and recorded in the translation table, where the match item is a binary code supported by the CPU and representing a specific computer instruction (a specific computer instruction represented by the operation code in the seventh binary code). The binary code with the replaced operation code is used as an eighth binary code. In the eighth binary code, the match item is an operation code of the eighth binary code, and the eighth binary code is acquired and added to the third instruction set. Therefore, it can be known that, when the third instruction set that is applicable to the first operating system is acquired according to the binary codes starting from the sixth binary code in the second instruction set in step B1003, each seventh binary code starting from the sixth binary code in the second instruction set is translated into a corresponding eighth binary code, and the eighth binary code is acquired and added to the third instruction set.

In addition, optionally, if the register of the coprocessor and the register of the CPU are not the same type of register, there are two processing manners:

The first processing manner is processing by the coprocessor. Specifically, when the third instruction set that is applicable to the first operating system is acquired according to the binary codes starting from the sixth binary code in the second instruction set in step B1003, and step B1003 is executed to translate the register address of the coprocessor included in the binary codes starting from the sixth binary code in the second instruction set into the register address of the CPU, and the register address of the CPU is acquired and added to the third instruction set. In this case, an execution sequence of acquiring the eighth binary code according to the translation table and translating the register address in the first processing manner is not limited, and is generally concurrent execution.

The second processing manner is processing by the CPU. Specifically, after the CPU receives the third instruction set migrated by the coprocessor in step B1003, the CPU replaces the register address of the coprocessor in the third instruction set with the register address of the CPU.

Optionally, if the second instruction set is stored in the memory of the CPU, the second instruction set stored in the memory of the CPU is replaced with the third instruction set according to the storage address of the second instruction set in the memory of the CPU in step B1003. If the second instruction set is stored in the memory of the coprocessor, the third instruction set is migrated to the CPU in step B1003, so that the CPU stores the third instruction set in the memory of the CPU.

In this optional manner, a binary code identification exception is triggered when the coprocessor executes the sixth binary code, and therefore, the coprocessor migrates the second instruction set that is not executed completely to the CPU; during migration of the second instruction set that is not executed completely to the CPU, if data related to the second instruction set that is not executed completely is stored in the memory of the coprocessor, the data related to the second instruction set that is not executed completely and stored in the memory of the coprocessor is sent to the CPU, where the data related to the second instruction set that is not executed completely includes the third instruction set migrated to the CPU, so that the CPU stores, in the memory of the CPU, the data related to the second instruction set that is not executed completely. In addition, the coprocessor further sends a register value related to the second instruction set that is not executed completely to the CPU, and the CPU stores, in the register of the CPU (corresponding to the register address in the third instruction set), the register value related to the second instruction set that is not executed completely.

Figure 11:
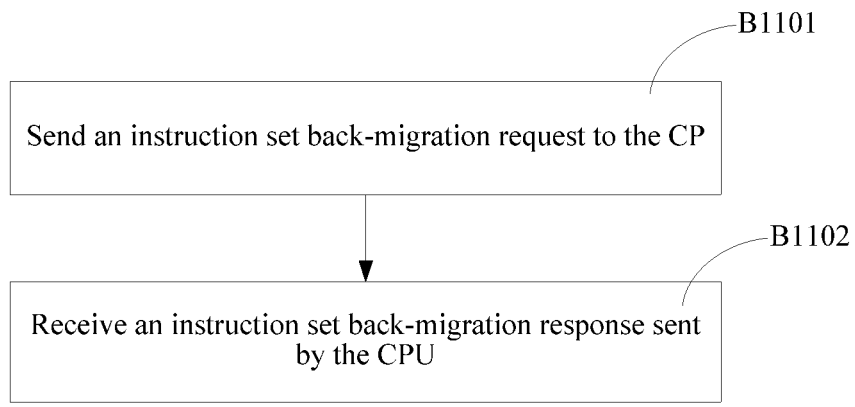
FIG. 11 is an optional exemplary flowchart for handling a binary code exception in step A403.

In a fourth optional manner, referring to FIG. 11, before the third instruction set that is applicable to the first operating system is acquired according to the binary codes starting from the sixth binary code in the second instruction set in step B1003, step B1101 and step B1102 are further included.

Step B1101: Send an instruction set back-migration request to the CPU.

Step B1102: Receive an instruction set back-migration response sent by the CPU.

Specifically, a binary code identification exception occurs when the second instruction set is executed in step A403, and step B1101 is executed to send an instruction set back-migration request to the CPU. The CPU responds to the instruction set back-migration request, determines whether to migrate the second instruction set back to the CPU for execution, and if determining to migrate back the second instruction set, feeds back an instruction set back-migration response to the coprocessor. The coprocessor receives the instruction set back-migration response in step B1003, and executes step B1003 to acquire, according to the binary codes starting from the sixth binary code in the second instruction set, the third instruction set that is applicable to the first operating system.

An optional manner of responding to the instruction set back-migration request by the CPU is: determining, according to CPU load, whether to migrate the second instruction set back to the CPU for execution, where the CPU load includes CPU usage, and memory usage of the memory used by the CPU. If CPU usage of the CPU is less than or equal to a fifth threshold, and memory usage of the memory used by the CPU is less than or equal to a sixth threshold, the instruction set back-migration response is sent to the coprocessor.

Figure 12:
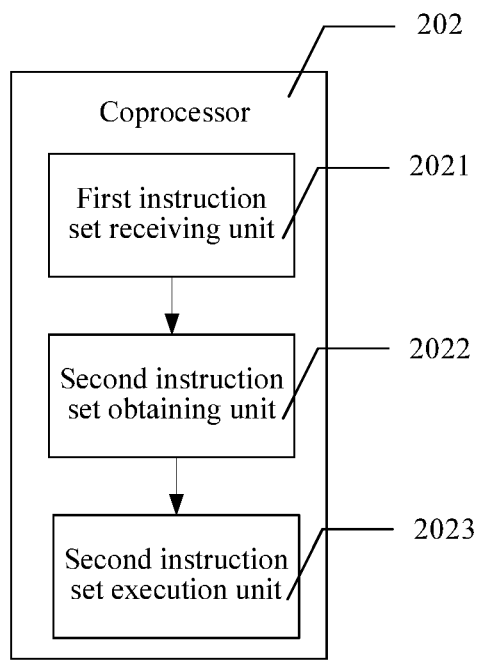
FIG. 12 is a schematic diagram of a logical structure of a coprocessor 202.

In an embodiment of the present application, FIG. 12 is a schematic diagram of an optional logical structure of a coprocessor 202 in the embodiment. The coprocessor 202 is applied to a processor system. The processor system includes the coprocessor 202 and a central processing unit (CPU) that runs a first operating system, where a second operating system runs on the coprocessor 202.

The coprocessor 202 includes:

a first instruction set receiving unit 2021, configured to receive a first instruction set migrated by the central processing unit, where the first instruction set is used to instruct the central processing unit to execute computer operations in the first operating system, and the first instruction set is a set of binary codes that are applicable to the first operating system;

a second instruction set obtaining unit 2022, configured to obtain a second instruction set according to the first instruction set, where binary codes in the second instruction set are used to instruct the coprocessor 202 to execute the computer operations in the second operating system; and a second instruction set execution unit 2023, configured to execute the binary codes in the second instruction set.

Optionally, that the second instruction set obtaining unit 2022 is configured to obtain a second instruction set according to the first instruction set includes:

the second instruction set obtaining unit 2022 is configured to match, in a preset translation table, operation codes of the binary codes in the first instruction set, and if an operation code of a first binary code in the first instruction set is found in the translation table, translate the operation code of the first binary code into an operation code of a second binary code according to a match item corresponding to the operation code of the first binary code in the translation table, obtain the second binary code, and obtain the second instruction set according to at least one second binary code that is obtained, where the translation table includes a correspondence between different operation codes that are respectively generated for the first operating system and the second operating system by compiling a same computer instruction, and the second binary code is a binary code that is applicable to the second operating system.

Figure 13:
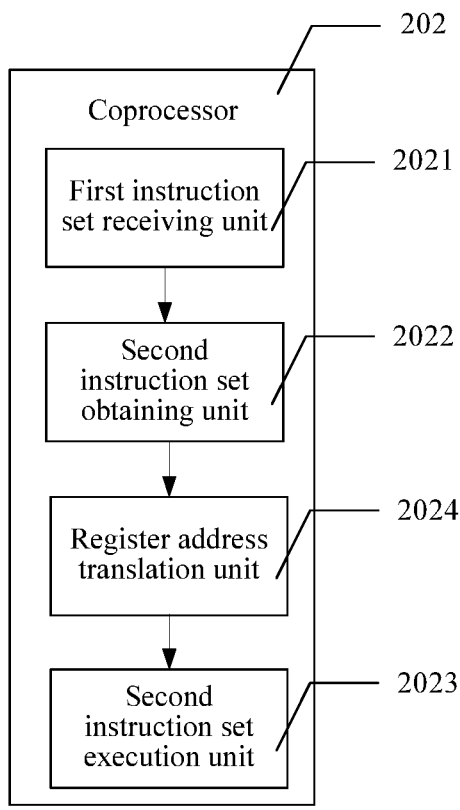
FIG. 13 is a schematic diagram of an optional logical structure of a coprocessor 202.

Optionally, referring to FIG. 13, the coprocessor 202 further includes:

a register address translation unit 2024, configured to translate a register address of the central processing unit in the binary codes included in the second instruction set into a register address of the coprocessor 202.

Optionally, the second instruction set obtaining unit 2022 is further configured to: if an operation code of a third binary code in the first instruction set is not found in the translation table, use, by the coprocessor 202, the third binary code as a binary code in the second instruction set.

Optionally, the first instruction set is migrated to the coprocessor 202 by the central processing unit when CPU usage of the central processing unit is greater than a first threshold.

Optionally, that the first instruction set receiving unit 2021 is configured to receive a first instruction set migrated by the central processing unit includes:

the first instruction set receiving unit 2021 is configured to receive an address of the to-be-migrated first instruction set that is sent by the central processing unit, and acquire the first instruction set by accessing a memory of the central processing unit based on the address of the first instruction set, where the address of the first instruction set is a storage address of the first instruction set in the memory of the central processing unit, and the address of the first instruction set is sent to the coprocessor 202 by the central processing unit when memory usage of the central processing unit is less than or equal to a second threshold.

Optionally, the first instruction set is sent to the coprocessor 202 by the central processing unit when memory usage of the central processing unit is greater than a second threshold.

Optionally, that the second instruction set execution unit 2023 is configured to execute the binary codes in the second instruction set includes:

the second instruction set execution unit 2023 is configured to: execute the binary codes in the second instruction set in sequence; and if a binary code identification exception is detected during execution of the second instruction set, determine a fourth binary code that triggers the exception, translate the fourth binary code into an intermediate code, then translate the intermediate code into a fifth binary code that is applicable to the second operating system, execute the fifth binary code, and continue to execute a binary code after the fourth binary code in the second instruction set.

Optionally, the second instruction set execution unit 2023 is further configured to: before translating the fourth binary code into the intermediate code, send an instruction set back-migration request to the central processing unit, and receive a back-migration reject instruction sent by the central processing unit.

Optionally, that the second instruction set execution unit 2023 is configured to execute the binary codes in the second instruction set includes:

the second instruction set execution unit 2023 is configured to: execute the binary codes in the second instruction set in sequence; if a binary code identification exception is detected during execution of the second instruction set, determine a sixth binary code that triggers the exception; and acquire, according to binary codes starting from the sixth binary code in the second instruction set, a third instruction set that is applicable to the first operating system, and migrate the third instruction set to the central processing unit.

Optionally, the second instruction set execution unit 2023 is further configured to: before acquiring, according to the binary codes starting from the sixth binary code in the second instruction set, the third instruction set that is applicable to the first operating system, send an instruction set back-migration request to the central processing unit, and receive an instruction set back-migration response sent by the central processing unit.

Figure 14:
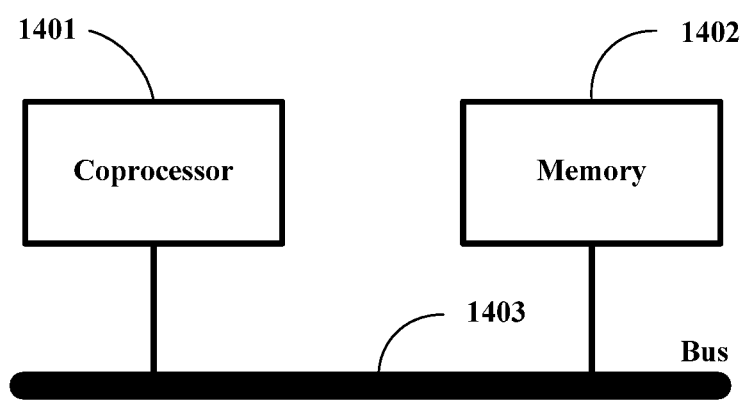
FIG. 14 is a schematic diagram of a logical structure of a system including a coprocessor 1401 and a memory 1402.

In an embodiment of the present application, FIG. 14 is a schematic diagram of a hardware structure of a coprocessor 1401 provided by the embodiment, and shows the hardware structure of the coprocessor 1401.

As shown in FIG. 14, the coprocessor 1401 is connected to a memory 1402 by using a bus 1403, the memory 1402 is configured to store a computer execution instruction, and the coprocessor 1401 reads the computer execution instruction stored in the memory 1402 to execute the computer instruction processing method provided by the foregoing embodiment. For specific implementation of the computer instruction processing method, refer to related descriptions about the computer instruction processing method in the foregoing embodiment. No further description is provided herein.

The coprocessor 1401 may use an Intel many integrated core (MIC) architecture, a microprocessor, an application-specific integrated circuit (ASIC), or one or more integrated circuits, and is configured to execute a related program to implement the technical solution provided by the foregoing method embodiment, including executing the computer instruction processing method provided by the foregoing embodiment.

The memory 1402 may be a read-only memory (ROM), a static storage device, a dynamic storage device, or a random access memory (RAM). The memory 1402 may store an operating system and other application programs. When the technical solution provided by the foregoing method embodiment is implemented by using software or firmware, program code used for implementing the technical solution provided by the foregoing method embodiment is stored in the memory 1402, including storing program code of the computer instruction processing method that is provided by the foregoing embodiment and applied to the coprocessor 1401 in the memory 1402, and the program code is executed by the coprocessor 1401.

The bus 1403 may include a channel, and is configured to transfer information between each component in the coprocessor 1401 and the memory 1402.

It should be noted that, although only the coprocessor 1401, the memory 1402, and the bus 1403 are shown in the coprocessor 1401 shown in FIG. 14, during specific implementation, persons skilled in the art should understand that the coprocessor 1401 further includes other components necessary for implementing normal running, for example, a communications interface. In addition, according to a specific requirement, persons skilled in the art should understand that the coprocessor 1401 may further include a hardware component that implements other additional functions. In addition, persons skilled in the art should understand that, the coprocessor 1401 may also include only a component necessary for implementing the foregoing method embodiment, but does not need to include all components shown in FIG. 14.

In an embodiment of the present application, a system 200 is provided. Referring to FIG. 1, the coprocessor system 200 includes a central processing unit 201 (CPU) and a coprocessor 202, where a first operating system runs on the CPU, and a second operating system runs on the coprocessor 202, where the central processing unit 201 is configured to migrate a first instruction set to the coprocessor 202; and the coprocessor 202 is configured to execute the computer instruction processing method provided by the foregoing embodiment or the optional refined manners of the foregoing embodiment.

In the several embodiments provided in the present application, it should be understood that the disclosed system, device, and method may be implemented in other manners. For example, the described device embodiment is merely exemplary. For example, the module and unit division is merely logical function division and may be other division during implementation. For example, a plurality of modules, units or components may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts as modules may or may not be physical modules, may be located in one position, or may be distributed on a plurality of network modules. Some or all of the modules may be selected according to actual needs to achieve the objectives of the solutions of the embodiments.

In addition, functional modules in the embodiments of the present application may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) to perform some of the steps of the methods described in the embodiments of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

In summary, what is described above is merely exemplary embodiments of the technical solutions of the present application, but is not intended to limit the protection scope of the present application. Any modification, equivalent replacement, or improvement made without departing from the spirit and principle of the present application shall fall within the protection scope of the present application.

What is claimed is:

1. A computer instruction processing method for a processor system, wherein the processor system comprises a coprocessor and a central processing unit (CPU), a first operating system that runs on the CPU, and a second operating system that runs on the coprocessor, wherein the method comprises:
    receiving, by the coprocessor, a first instruction set applicable to instruct the CPU to perform computer operations in the first operating system;
    obtaining, by the coprocessor and according to the first instruction set, a second instruction set for the coprocessor to perform the computer operations in the second operating system;
    translating, by the coprocessor, a register address of the CPU in the second instruction set into a register address of the coprocessor; and
    executing, by the coprocessor, the second instruction set.

2. The method according to claim 1, wherein the obtaining comprises:
    matching, by the coprocessor, an operation code of a first binary code in the first instruction set with a match item in a preset translation table, wherein the preset translation table comprises a correspondence between different operation codes that are respectively generated for the first operating system and the second operating system by compiling a same computer instruction;
    translating the operation code of the first binary code into an operation code of a second binary code of the second instruction set according to the match item, wherein the second binary code is applicable to the second operating system.

3. The method according to claim 2, wherein a binary code in the second instruction set is obtained as a third binary code in the first instruction set, wherein the preset translation table does not include an operation code of the third binary code.

4. The method according to claim 1, wherein the first instruction set is received as a migration by the CPU when CPU usage of the CPU is greater than a first threshold.

5. The method according to claim 4, wherein an address of the first instruction set is received as a storage address in a memory of the CPU, wherein the address of the first instruction set is sent to the coprocessor by the CPU when memory usage of the CPU is less than or equal to a second threshold, and wherein the receiving comprises
    accessing the memory of the CPU based on the address of the first instruction set.

6. The method according to claim 1, wherein the first instruction set is sent to the coprocessor by the CPU when memory usage of the CPU is greater than a second threshold.

7. The method according to claim 1, wherein the second instruction set is executed in sequence, the method further comprising:
    detecting a binary code identification exception during an execution of the second instruction set;
    determining a fourth binary code that triggers the binary code identification exception;
    translating the fourth binary code into an intermediate code;
    translating the intermediate code into a fifth binary code that is applicable to the second operating system; and
    executing the fifth binary code, and continuing to execute a binary code after the fourth binary code in the sequence of the second instruction set.

8. The method according to claim 7, wherein the method further comprises:
    sending an instruction set back-migration request to the CPU; and
    receiving a back-migration reject instruction sent by the CPU.

9. The method according to claim 1, wherein the second instruction set is executed in sequence, and wherein the method further comprises:
    detecting a binary code identification exception during an execution of the second instruction set;
    determining a sixth binary code that triggers the binary code identification exception; and
    acquiring, according to binary codes starting from the sixth binary code in the sequence of the second instruction set, a third instruction set that is applicable to the first operating system, and migrating the third instruction set to the CPU.

10. The method according to claim 9, wherein the method further comprises:
    sending an instruction set back-migration request to the CPU; and
    receiving an instruction set back-migration response sent by the CPU.

11. A coprocessor in a processor system, wherein the processor system comprises a central processing unit (CPU) and a coprocessor, wherein a first operating system that runs on the CPU, and a second operating system that runs on the coprocessor; and wherein the coprocessor is configured to:
    receive a first instruction set applicable to instruct the CPU to perform computer operations in the first operating system;
    obtain according to the first instruction set, a second instruction set for the coprocessor to perform the computer operations in the second operating system;
    translate a register address of the CPU in the second instruction set into a register address of the coprocessor; and
    execute the second instruction set.

12. The coprocessor according to claim 11, wherein the coprocessor is configured to:

match an operation code of a first binary code in the first instruction set with a match item in a preset translation table, wherein the preset translation table comprises a correspondence between different operation codes that are respectively generated for the first operating system and the second operating system by compiling a same computer instruction; and translate the operation code of the first binary code into an operation code of a second binary code of the second instruction set according to the match item, wherein the second binary code is applicable to the second operating system.

13. The coprocessor according to claim 12, wherein a binary code in the second instruction set is obtained as a third binary code in the first instruction set, wherein the preset translation table does not include an operation code of the third binary code.

14. The coprocessor according to claim 11, wherein the first instruction set is received as a migration by the CPU when CPU usage of the CPU is greater than a first threshold.

15. The coprocessor according to claim 14, wherein an address of the first instruction set is received as a storage address in a memory of the CPU, wherein the address of the first instruction set is sent to the coprocessor by the CPU when memory usage of the CPU is less than or equal to a second threshold, and wherein the coprocessor is configured to access the memory of the CPU based on the address of the first instruction set.

16. The coprocessor according to claim 11, wherein the first instruction set is sent to the coprocessor by the CPU when memory usage of the CPU is greater than a second threshold.

17. The coprocessor according to claim 11, wherein the second instruction set is executed in sequence, and wherein the coprocessor is further configured to detect a binary code identification exception during an execution of the second instruction set;

determine a fourth binary code that triggers the binary code identification exception;

translate the fourth binary code into an intermediate code;

translate the intermediate code into a fifth binary code that is applicable to the second operating system;

execute the fifth binary code and a binary code after the fourth binary code in the sequence of the second instruction set.

18. The coprocessor according to claim 17, wherein the coprocessor is configured to send an instruction set back-migration request to the CPU, and receive a back-migration reject instruction sent by the CPU.

19. The coprocessor according to claim 11, wherein the second instruction set is executed in sequence; and wherein the coprocessor is configured to detect a binary code identification exception during an execution of the second instruction set; determine a sixth binary code that triggers the binary code identification exception; and acquire, according to binary codes starting from the sixth binary code in the sequence of the second instruction set, a third instruction set that is applicable to the first operating system, and migrate the third instruction set to the CPU.

20. The coprocessor according to claim 19, wherein the coprocessor is configured to send an instruction set back-migration request to the CPU, and receive an instruction set back-migration response sent by the CPU.

21. A processor system, wherein the processor system comprises a central processing unit (CPU) and a coprocessor, a first operating system that runs on the CPU, and a second operating system that runs on the coprocessor, wherein the CPU is configured to migrate a first instruction set to the coprocessor, the first instruction set applicable to instruct the CPU to perform computer operations in the first operating system; and the coprocessor is configured to:

receive the first instruction set, obtain, according to the first instruction set, a second instruction set for the coprocessor to perform the computer operations in the second operating system, translate a register address of the CPU in the second instruction set into a register address of the coprocessor, and execute the second instruction set.

* * * * *